(12) United States Patent
Matsumoto

(10) Patent No.: US 8,406,094 B2
(45) Date of Patent: Mar. 26, 2013

(54) HEAT-ASSISTED RECORDING HEAD AND HEAT-ASSISTED RECORDING DEVICE

(75) Inventor: Takuya Matsumoto, Sunnyvale, CA (US)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 13/382,306

(22) PCT Filed: Jun. 24, 2010

(86) PCT No.: PCT/JP2010/060718
§ 371 (c)(1),
(2), (4) Date: Jan. 5, 2012

(87) PCT Pub. No.: WO2011/004716
PCT Pub. Date: Jan. 13, 2011

(65) Prior Publication Data
US 2012/0113771 A1    May 10, 2012

(30) Foreign Application Priority Data
Jul. 6, 2009    (JP) .................. 2009-160072

(51) Int. Cl.
*G11B 11/00* (2006.01)
(52) U.S. Cl. .............. 369/13.33; 369/13.13; 369/112.27
(58) Field of Classification Search .............. 369/13.33, 369/13.32, 13.24, 13.14, 13.03, 13.12, 13.02, 369/112.27, 112.09, 112.01, 13.13, 13.01, 369/13.35, 13.17; 360/59, 125.31, 125.74
See application file for complete search history.

(56) References Cited

U.S. PATENT DOCUMENTS

| | | | |
|---|---|---|---|
| 6,768,556 B1 | 7/2004 | Matsumoto et al. | |
| 7,330,404 B2* | 2/2008 | Peng et al. ................. | 369/13.33 |
| 7,359,599 B2* | 4/2008 | Matsumoto .................... | 385/47 |
| 7,529,158 B2* | 5/2009 | Matsumoto et al. ........ | 369/13.33 |
| 8,054,571 B2* | 11/2011 | Matsumoto et al. ............ | 360/59 |
| 8,130,598 B2* | 3/2012 | Matsumoto et al. ....... | 369/13.33 |
| 2004/0085862 A1 | 5/2004 | Matsumoto et al. | |
| 2005/0078565 A1 | 4/2005 | Peng et al. | |
| 2007/0096854 A1 | 5/2007 | Matsumoto et al. | |
| 2007/0242921 A1 | 10/2007 | Matsumoto | |

(Continued)

FOREIGN PATENT DOCUMENTS

| JP | 2001-255254 | 9/2001 |
|---|---|---|
| JP | 2004-151046 | 5/2004 |
| JP | 2005-4901 | 1/2005 |
| JP | 2005-116155 | 4/2005 |
| JP | 2007-128573 | 5/2007 |

(Continued)

OTHER PUBLICATIONS

Hideki Saga et al., New Recording Method Combining Thermo-Magnetic Writing and Flux Detection, Japanese Journal of Applied Physics, Mar. 1999, pp. 1839-1840, vol. 38, Part 1, No. 3B, saga@crl.hitachi.co.jp.

*Primary Examiner* — Ali Neyzari
(74) *Attorney, Agent, or Firm* — Antonelli, Terry, Stout & Kraus, LLP.

(57) ABSTRACT

In a thermally assisted recording head using a conductive scatterer as an optical near-field transducer, a propagation loss in a waveguide for guiding light to the scatterer is reduced. An optical near-field is generated by using the conductive scatterer having a width that gradually becomes smaller toward a vertex at which the optical near-field is generated. At the same time, a height of the conductive scatterer for generating the optical near-field is made substantially equal to a height of a main pole or longer than the height of the main pole.

13 Claims, 21 Drawing Sheets

U.S. PATENT DOCUMENTS

| | | |
|---|---|---|
| 2010/0284252 A1 | 11/2010 | Hirata et al. |
| 2011/0096639 A1* | 4/2011 | Matsumoto ................ 369/13.33 |
| 2011/0116349 A1* | 5/2011 | Komura et al. ............ 369/13.33 |
| 2011/0170381 A1* | 7/2011 | Matsumoto ................ 369/13.33 |

FOREIGN PATENT DOCUMENTS

| | | |
|---|---|---|
| JP | 2007-280572 | 10/2007 |
| JP | 2009-87508 | 4/2009 |

* cited by examiner (a)

(b)

(a)

(b)

(a)

(b)

(a)

(b)

(a)

(b)

(a)

(b)

(a)

(b)

(a)

(b)

(a)

(b)

(c)

HEAT-ASSISTED RECORDING HEAD AND HEAT-ASSISTED RECORDING DEVICE

TECHNICAL FILED

The present invention relates to a thermally assisted recording head and a thermally assisted recording device.

BACKGROUND ART

In recent years, a thermally assisted recording method has been proposed as a recording method achieving a recoding density of 1 Tb/in$^2$ or higher (H. Saga, H. Nemoto, H. Sukeda, and M. Takahashi, Jpn. J. Appl. Phys. 38, Part 1, 1839 (1999)). Conventional magnetic recording devices have a problem that information recorded at a recoding density of 1 Tb/in$^2$ or higher may be lost due to thermal fluctuations. Although the coercivity of a magnetic recording medium needs to be increased to prevent the above problem, an excessive increase of the coercivity disables the formation of recording bits on the medium because of the limitation to the intensity of the magnetic field that the recording head can generate. To solve this problem, in the thermally assisted recording method, the coercivity of a medium is reduced by heating the medium with light at a moment of recording. This enables recording on a high-coercivity medium, and thereby achieves a recording density of 1 Tb/in$^2$ or higher.

In this thermally assisted recording device, the diameter of a light spot for irradiation needs to be made approximately equal to a recoding bit (several tens nanometers). This is because a light spot with a larger diameter than the above erases information recorded on adjacent tracks. An optical near-field is used to heat such a small area. The optical near-field is an electromagnetic field (light having a wavenumber with an imaginary component) locally existing in the vicinity of a minute object with a diameter not larger than a light wavelength, and is generated by using a minute opening or metal scatterer with a diameter not larger than the light wavelength. JP 2001-255254 A, for example, proposes an optical near-field generator using a metal scatterer with a triangular shape as a highly-efficient optical near-field generator. When light enters the metal scatterer, a plasmon resonance is excited inside the metal scatterer, and a strong optical near-field is generated at a vertex of the triangle. With use of this optical near-field generator, the light can be highly-efficiently converged into a region of several tens nanometers or smaller. In addition, JP 2004-151046 A proposes a structure of the metal scatterer in which the surface of the scatterer on a slider air bearing surface side is partly depressed by scraping out a portion of the surface except for the vertex at which the optical near-field is generated. This structure is able to reduce the width of the intensity distribution of the optical near-field generated at the vertex and also prevent generation of a weak optical near-field (background light) at the side opposite to the vertex.

PRIOR ART DOCUMENTS

Patent Documents

Patent Document 1: JP 2001-255254 A
Patent Document 2: JP 2004-151046 A

Non-Patent Document

Non-patent Document 1: Jpn. J. Appl. Phys. 38, Part 1, 1839 (1999)

SUMMARY OF THE INVENTION

Problems to be Solved by the Invention

In order to form a recording mark, the foregoing thermally assisted recording device is required to heat a medium by using an optical near-field transducer and apply a strong recording magnetic field to the same position as the heating point at the same time. The optical near-field transducer to generate a minute light spot and a magnetic pole to apply the recording magnetic field are installed at places displaced from each other, since the two cannot be installed at the same place. In this regard, too large a distance between the position of the light spot and the magnetic pole makes the magnetic field intensity weak, which requires an increase in the heating temperature necessary for recording. As a result, it is necessary to increase the power of the light source, which in turn results in an increase in power consumption. For this reason, the distance between the position of the light spot (the position of the optical near-field transducer) and the magnetic pole needs to be made as small as possible.

On the other hand, the light to be emitted onto the optical near-field transducer is guided by a waveguide formed above the optical near-field transducer (on the opposite side of the medium). The distance between the waveguide and the magnetic pole needs to be made as small as possible in order to minimize the distance between the optical near-field transducer and the magnetic pole to a maximum extent. If the distance between the waveguide and the magnetic pole is small, however, evanescent light components leaking out to a clad portion of the waveguide fall on the magnetic pole and are absorbed or scattered by the magnetic pole. Consequently, the intensity of light propagating in the waveguide is reduced due to the influence of the magnetic pole. Proc. of SPIE Vol. 6620, p 66200, (2007), for example, presents the calculation result of the propagation loss of a waveguide in the case where the waveguide is formed in the vicinity of a Co magnetic pole. According to this document, the propagation loss is 90% in the case where the magnetic pole and the waveguide are placed in contact with each other. In addition, the center of light propagating inside the waveguide is shifted toward the opposite side of the magnetic pole due to the influence of the magnetic pole. This phenomenon results in a reduction in the intensity of light entering the optical near-field transducer arranged in the vicinity of the magnetic pole. To reduce this influence, the distance between the magnetic pole and the waveguide needs to be made large, but the large distance between the magnetic pole and the waveguide also makes the position of the exiting light far from the magnetic pole. This reduces the light amount of light incident on the optical near-field element arranged in the vicinity of the magnetic pole, and accordingly reduces the intensity of the optical near-field. As a result, the heating temperature is lowered. If the laser intensity is increased to compensate that, the power consumption is increased.

An objective of the present invention is to solve a reduction in the propagation efficiency of a waveguide due to influence of a magnetic pole.

Means for Solving the Problems

To achieve the forgoing objective, the present invention uses as a means for generating an optical near-field a conductive scatterer having a cross sectional shape whose width gradually becomes smaller toward a vertex at which the optical near-field is generated. A main pole for generating a recording magnetic field is placed beside the scatterer. A waveguide core for making light incident on the scatterer is placed above the scatterer. In addition, the height of the scatterer in the element height direction (the length in a direction orthogonal to a recording medium) is made substantially equal to the height of the main pole in the element height direction or larger than the height of the main pole. In this structure, the position of the light exit end of the waveguide core does not have to be at a level (on a side closer to the air bearing surface of a slider) below the upper side of the main pole. Thus, a propagation loss in the waveguide is prevented from increasing due to the magnetic pole. Note that, in this structure, plasmons are excited on the upper surface of the scatterer by incident light. The plasmons propagate downward and are transmitted to the air bearing surface side of the scatterer. For this reason, even though the waveguide is terminated above the main pole, the light spot is transmitted to the slider air bearing surface side without spreading out.

The magnetic field intensity at the position where the optical near-field is generated can be increased when the distance between the main pole and the vertex at which the optical near-field is generated is made as small as possible. It is preferable that the distance between the main pole and the vertex at which the optical near-field is generated be 50 nm or shorter for achieving a recording density of 1 Tb/in$^2$ or higher, 30 nm or shorter for achieving a recording density of 3 Tb/in$^2$ or higher, or 20 nm or shorter for achieving a recording density of 5 Tb/in$^2$ or higher.

If the height of the main pole is too small, the area of a joint potion of the main pole with the thick magnetic pole in contact with the main pole is so small as to suppress a flow of magnetic flux into the main pole 2. As a result, the intensity of the magnetic field generated at the tip end of the main pole becomes weak. A preferable height of the main pole is 150 nm or longer for achieving the recording density of 1 Tb/in$^2$ or higher, 250 nm or longer for achieving the recording density of 3 Tb/in$^2$ or higher, or 350 nm or longer for achieving the recording density of 5 Tb/in$^2$ or higher.

The intensity of the optical near-field generated at the vertex of the scatterer on the air bearing surface side depends on the height of the scatterer. Specifically, the plasmons propagating inside the scatterer are reflected by the lower side and the upper side of the scatterer, and cause interference inside the scatterer. In this connection, if the height of the scatterer (the length in the element height direction) is optimized, the intensity of the optical near-field can be increased.

In order to obtain a medium heating temperature of 200° C. or higher that is necessary to achieve the recording density of 1 Tb/in$^2$, the height of the scatterer is preferably set at 200 nm to 2.06λ-1120 [nm], both inclusive, where λ[nm] denotes the wavelength of incident light.

In order to obtain a medium heating temperature of 250° C. or higher that is necessary to achieve the recording density of 5 Tb/in$^2$ in the case of the wavelength of 890 nm or longer, the height of the scatterer H (unit: nm) is preferably set within a range satisfying the following formula:

$$\frac{\lambda - 890}{90}(-150n + 283) - 291n + 835 \leq$$
$$H \leq \frac{\lambda - 890}{90}(-130n + 310) - 397n + 1250,$$

where n denotes a refractive index of the material for a surrounding area of the scatterer.

The surrounding area of the scatterer may be formed of a material different from the material for the waveguide clad in order to increase the optical near-field intensity. In addition, in order to increase the strength of the tip end of the scatterer, the tip end portion may be formed of a harder material than the material for the other portion of the scatterer.

The scatterer for generating the optical near-field may be placed near the interface between the waveguide core and clad. Evanescent light leaks out to the waveguide clad portion. The wavenumber of the optical near-field generated at the scatterer is an imaginary number. One component of the wavenumber of the evanescent light leaking out to the clad portion is an imaginary number as well. Thus, the evanescent light leaking out to the clad portion is similar in wavenumber to the optical near-field, and thereby is efficiently converted into the optical near-field. An optimal range of a distance (dx) between the end of the waveguide core and the vertex portion of the scatterer in a direction parallel to the air bearing surface is preferably −50 nm to 100 nm, both inclusive, for obtaining the medium heating temperature of 200° C. that is necessary to achieve the recording density of 1 Tb/in$^2$, and −10 nm to 70 nm, both inclusive, for obtaining the medium heating temperature of 250° C. that is necessary to achieve the recording density of 5 Tb/in$^2$.

In the above structure, a thin soft magnetic layer may be formed between the main pole and the magnetic pole for transmitting the magnetic field from the coil. This facilitates a flow, into the main pole, of the magnetic flux transmitted inside the magnetic pole 27 for transmitting the magnetic field generated from the coil, and thereby can increase the intensity of the magnetic field generated at the tip end of the main pole. In this case, the distance to the thin soft magnetic layer from the edge of the main pole on a side closer to the vertex at which the optical near-field is generated is preferably set at 50 nm in order to prevent a propagation loss in the waveguide.

In the foregoing structure, the preferable cross sectional shape of the main pole is rectangular or trapezoid. In addition, the heating point by the optical near-field may be made closer to the main pole by forming a depression in a portion of the main pole in an area close to the vertex of the scatterer at which the optical near-field is generated. With this structure, the magnetic field intensity at the heating point can be increased, and the recording density can be increased because the thermal gradient and the magnetic field gradient can be made to coincide with each other. Moreover, if the main pole is formed with a rectangular or trapezoid cross sectional shape, the width of the magnetic pole may be set equal to the width of the vertex of the scatterer, or smaller than the width of the vertex of the scatterer. With this structure, the intensity of the magnetic field applied to adjacent tracks can be reduced, and thereby the data on the adjacent tracks is prevented from being erased. Further, a recess may be formed in a portion of the tip end of the main pole in order to increase the magnetic field intensity at the heating point.

Effects of the Invention

According to the present invention, in a thermally assisted reading head using a conductive scatterer as an optical near-field transducer, a propagation loss in a waveguide for guiding light to a scatterer can be reduced.

BRIEF DESCRIPTION OF THE DRAWINGS

FIG. 6(a) shows a case where the light exit end of the waveguide is located at a level below the upper side of the main pole; and FIG. 6(b) shows a case where the light exit end of the waveguide is located at a level equal to or higher than the upper side of the main pole.

FIG. 7(a) shows a case where the distance from the light exit end of the waveguide to the scatterer is fixed; and FIG. 7(b) shows a case where the distance from the light exit end of the waveguide to the upper side of the main pole is fixed.

FIG. 8(a) shows a case where $Al_2O_3$ is used as a material for a scatterer surrounding area; and FIG. 8(b) shows a case where $SiO_2$ is used as the material for the scatterer surrounding area.

FIG. 9(a) shows a relationship between the optimal range and the wavelength; and FIG. 9(b) shows a relationship between the optimal range and a refractive index.

FIG. 11(a) is a side view; and FIG. 11(b) is a view seen from the air bearing surface side.

FIG. 12(a) is a cross sectional side view; and FIG. 12(b) is a view seen from the air bearing surface side.

FIG. 13(a) shows an intensity distribution inside the waveguide; and FIG. 13(b) is a cross sectional side view around the scatterer.

FIG. 16(a) is a cross sectional side view; and FIG. 16(b) is a view seen from the air bearing surface side.

FIG. 17(a) shows a case where the shape is trapezoid; FIG. 17(b) shows a case where the width of the magnetic pole is equal to or smaller than the width of the tip end of the scatterer; and FIG. 17(c) shows a case where a depression is formed around the vertex at which the optical near-field is generated.

MODES FOR CARRYING OUT THE INVENTION

Hereinafter, embodiments of the present invention will be described with reference to the drawings.

Figure 1:
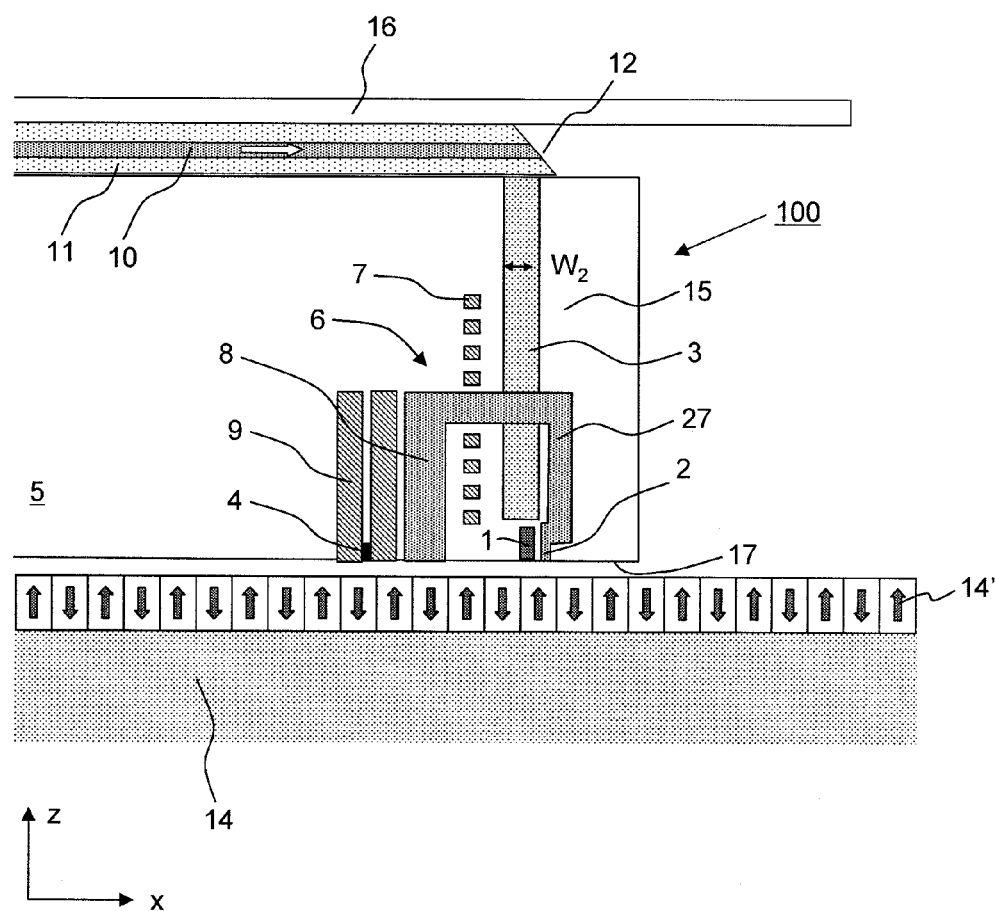
FIG. 1 is a cross sectional side view showing a thermally assisted recording head of the present invention.

FIG. 1 shows a configuration example of a thermally assisted magnetic head 100 according to the present invention.

Figure 20:
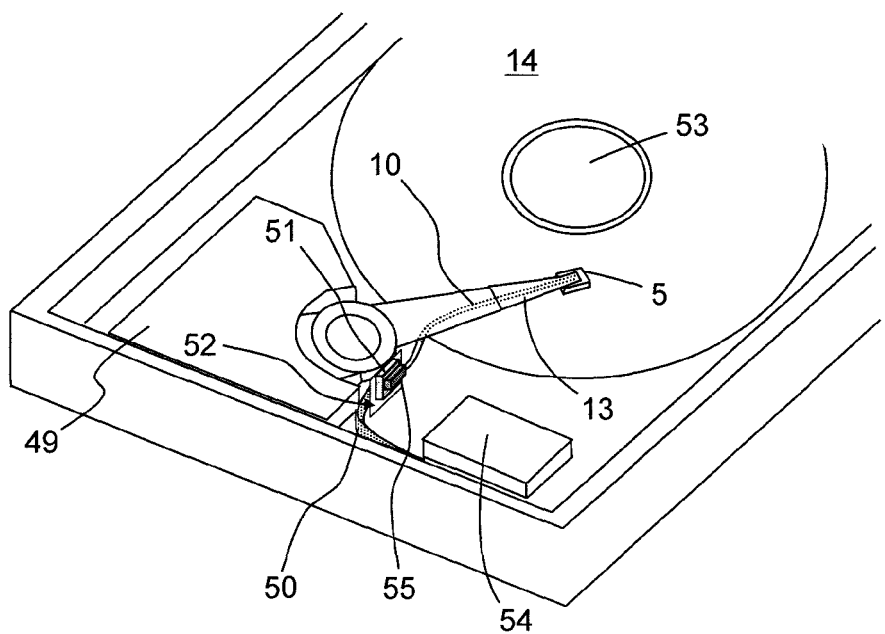
FIG. 20 is a view showing a configuration example of a recording and reading device.

A semiconductor laser having a wavelength of 780 to 980 nm is used as a light source, and is installed around the base of a suspension (see reference numeral 55 in FIG. 20). A polymer waveguide 10 (a core portion shown in FIG. 1) is used to propagate light from the light source to a slider 5. The polymer waveguide 10 is placed on the suspension 16. A 45-degree mirror 12 is formed on an end surface of the polymer waveguide 10 so that the light exiting from the polymer waveguide 10 can exit in a direction orthogonal to an upper surface of the slider 5. Although the polymer waveguide 10 is used as a waveguide for propagating light from the light source to the slider 5 in this embodiment, other types of waveguides formed of quartz fiber, plastic fiber and the like may be used instead.

Inside the air bearing slider 5, formed is a recording waveguide 3 (a core portion shown in FIG. 1) to guide the light to a slider air bearing surface 17 from the opposite side of the slider air bearing surface 17. The recording waveguide 3 inside the slider is formed by using $Ta_2O_5$ for a material for the core, and $Al_2O_3$ for a material for a clad potion 15. As for widths of the core, the core width in a direction orthogonal to a recording track direction is set at 600 nm and the core width in a direction parallel to the recording track direction ($W_2$ in FIG. 1) is set at 300 nm for a wavelength of 780 nm, whereas the core width in the direction orthogonal to the recording track direction is set at 700 nm and the core width in the direction parallel to the recording track direction ($W_2$ in FIG. 1) is set at 350 nm for a wavelength of 980 nm. Any materials may be used for the waveguide 3 as long as the materials satisfy a condition that the refractive index of the core is larger than the refractive index of the clad. For example, $Al_2O_3$ may be used as the material for the clad, whereas $TiO_2$ may be used as the material for the core. Alternatively, $SiO_2$ may be used as the material for the clad, whereas $Ta_2O_5$, $TiO_2$, $SiO_xN_y$, or Ge-doped $SiO_2$ may be used as the material for the core. An optical near-field transducer 1 to generate a light spot with a diameter of several tens nanometers is formed below a lower side (light exit end) of the waveguide 3.

A recording magnetic field is generated by a magnetic head unit 6 including a coil 7, a thick magnetic pole 27 for transmitting a magnetic flux generated by the coil, a main pole 2 and a return pole 8. The magnetic field generated by the coil 7 propagates through the thick magnetic pole 27 for transmitting the magnetic flux generated by the coil and then is guided to a vicinity of the optical near-field transducer 1 by the main pole 2. At a moment of recording, a recording mark is written onto a recording layer 14' by heating a recording medium 14 by the light generated by the optical near-field transducer and applying a recording magnetic field generated from the main pole 2 to the medium at the same time. Here, a distance ($W_3$) between the edge of the waveguide core 3 and the edge of the main pole 2 in an x direction is set at 50 nm.

A reading head including a magnetic reader 4 is formed beside the writing head as shown in FIG. 1. In this embodiment, a giant magneto resistive (GMR) element or a tunneling magneto resistive (TMR) element is used as the magnetic reader 4. A magnetic shield 9 for preventing a leakage of the magnetic field is formed around the magnetic reader 4.

Figure 2:
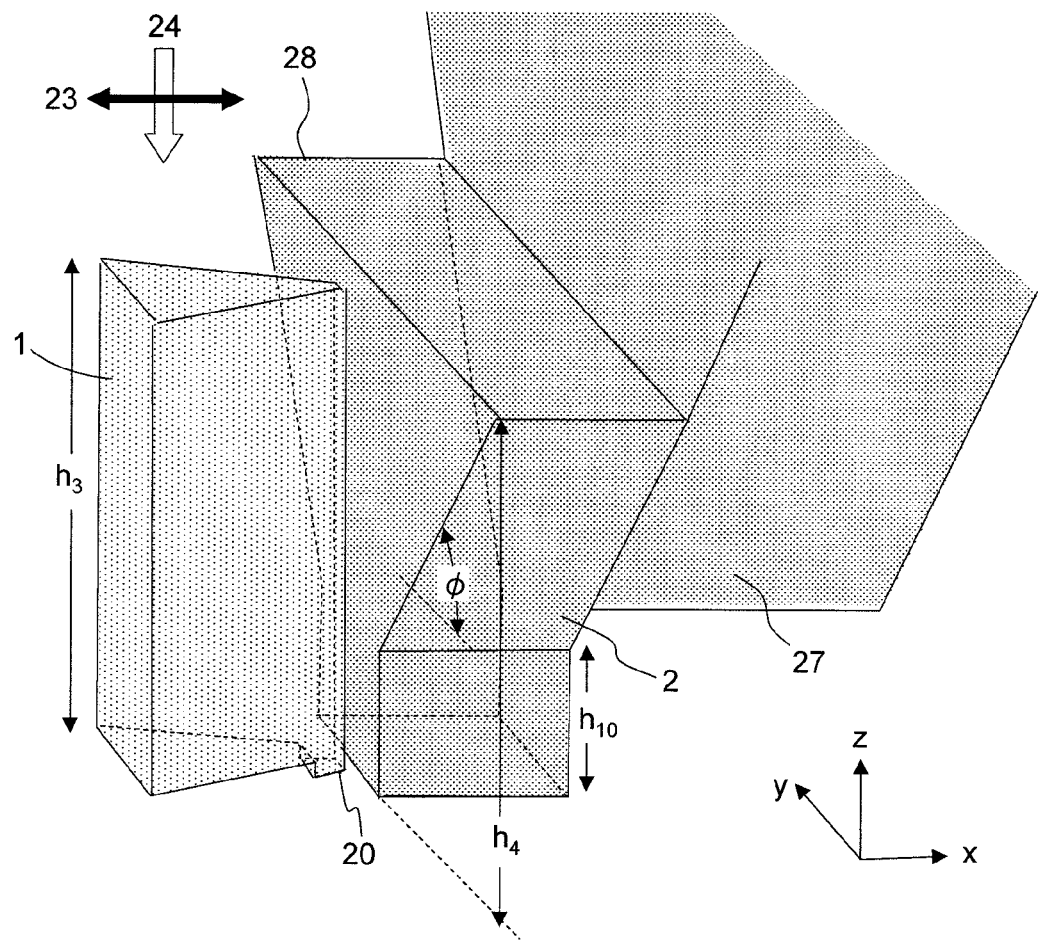
FIG. 2 is a diagram showing a part including a tip end of a main pole and an optical near-field transducer.
Figure 3:
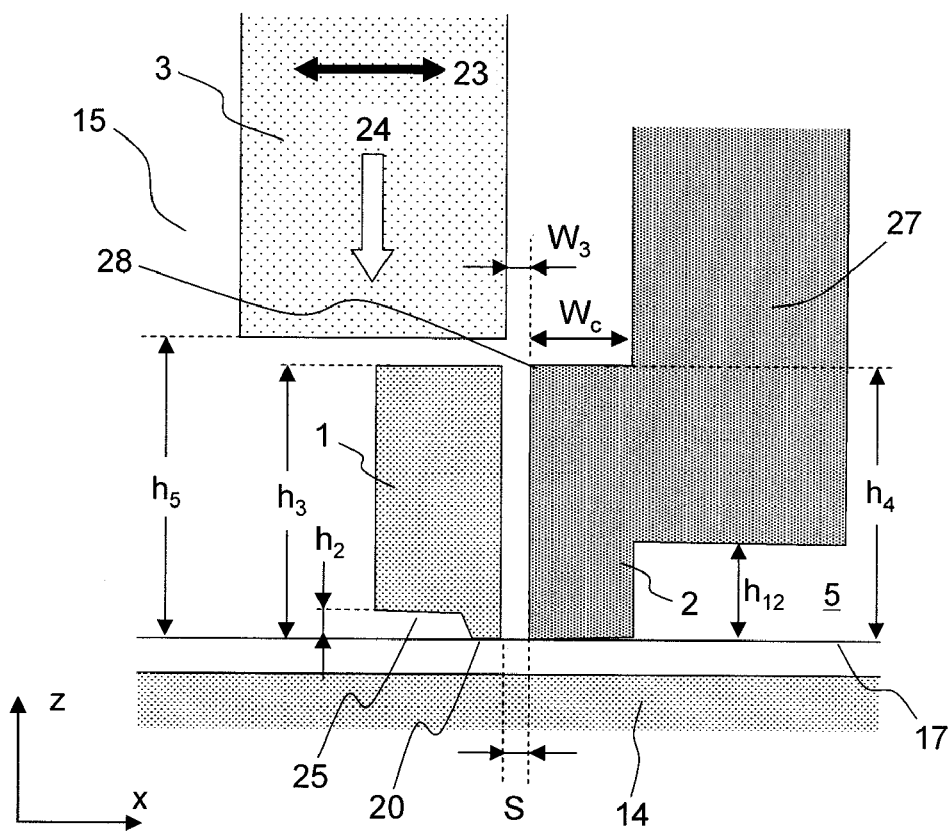
FIG. 3 is a cross sectional view showing the part including the tip end of the main pole and the optical near-field transducer, which is viewed from a lateral side.
Figure 4:
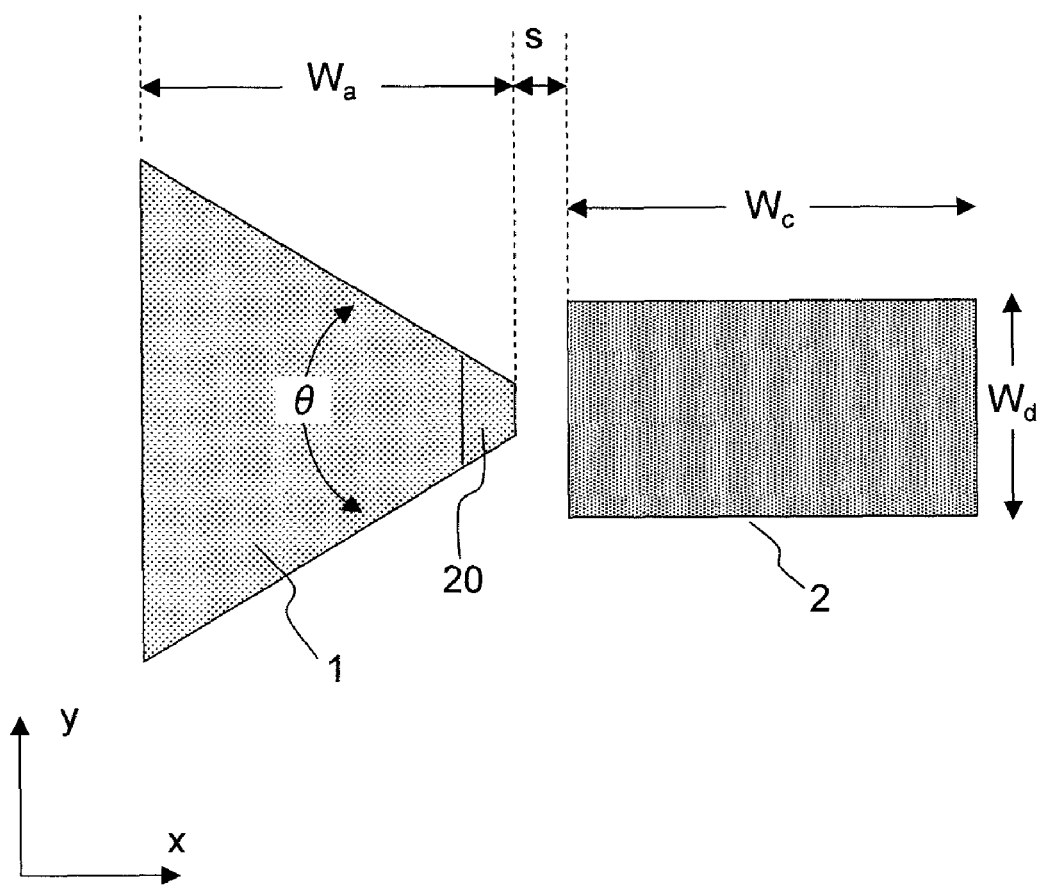
FIG. 4 is a cross sectional view showing the part including the tip end of the main pole and the optical near-field transducer, which is viewed from an air bearing surface side.

FIG. 2 shows an enlarged view of the main pole 2 and the optical near-field transducer 1. In addition, FIG. 3 shows a cross sectional view of that portion (cross sectional view taken in a direction parallel to the xz plane) and FIG. 4 shows a view of that portion viewed from an air bearing surface side.

As a magnetic pole, the main pole 2 is formed at a tip end of the thick magnetic pole 27 for transmitting the magnetic flux generated by the coil. The main pole 2 is formed to have a tip end having a narrowed width, so that the widths ($W_c$, $W_d$) of the tip end portion of the main pole in x and y directions are set at $W_c$=150 nm and $W_d$=100 nm and the height $h_{10}$ of the narrowed portion (throat height) is set at 50 nm. The portion above the narrowed portion is formed to gradually become larger in width, so that an angle φ of the tapered portion is set at 45 degrees. A distance ($h_{12}$) between the thick magnetic pole 27 and the slider air bearing surface 17 is set at 100 nm A NiFe or CoFe alloy is used as a material for the magnetic pole. With use of such structure, the magnetic field generated by the coil can be converted into a small area, and thereby a strong magnetic field at 3 kOe or higher can be generated at a light heating point.

A conductive scatterer 1 is used as the optical near-field transducer. When viewed from the slider air bearing surface, the scatterer 1 has a shape that gradually becomes smaller in width toward the vertex at which the optical near-field is generated, as shown in FIG. 2 (a triangular shape in this embodiment). When light polarized in a direction of arrow 23 (x direction) in FIG. 2 enters the scatterer in a direction of arrow 24, electric charges in the scatterer oscillate in a direction parallel to the polarization direction of the incident light. The oscillating electric charges are concentrated at a tip end portion 20, and the concentrated electric charges generate a locally-existing electric field, that is, an optical near-field in the vicinity of the tip end potion 20. In the oscillations of charges in the scatterer, there is a resonance frequency. When the resonance frequency coincides with the frequency of light, the light energy is efficiently converted into the oscillation energy of charges, and consequently a very strong optical near-field is generated at the vertex 20. If the recording medium 14 exists in the vicinity of the optical near-field element 1, in particular, the electric charges are attracted to the medium and a strong optical near-field is generated at the vertex 20 located close to the medium. In this embodiment, the length of the conductive scatterer 1 in the x direction ($W_a$ in FIG. 4) is set at 80 to 100 nm, and the vertex angle θ thereof is set at 60 degrees. The distance s between the main pole 2 and the vertex 20 at which the optical near-field is generated is set at 20 nm. Gold is used as a material for the scatterer. A portion 25 in a medium side surface of the scatterer except for the vertex 20 is formed such that the distance between the surface 25 of the scatterer and the medium surface can be larger than the distance between the vertex portion 20 of the scatterer and the medium surface. When light enters the scatterer, a weak optical near-field (background light) is generated at the side opposite to the vertex besides the vertex 20. When this background light is incident on the medium, the medium is heated at a portion other than the portion heated by the vertex portion 20, which creates a possibility that information recorded on that portion may be erased. When the medium side surface 25 of the scatterer is scraped out to increase the distance between the surface 25 and the medium surface, the weak optical near-field generated at the side opposite to the vertex 20 cannot reach the medium surface, and thereby the influence of this optical near-field on the medium can be reduced. In this embodiment, the depressed (recess) amount $h_2$ of the surface 25 is set at 10 nm.

Figure 21:
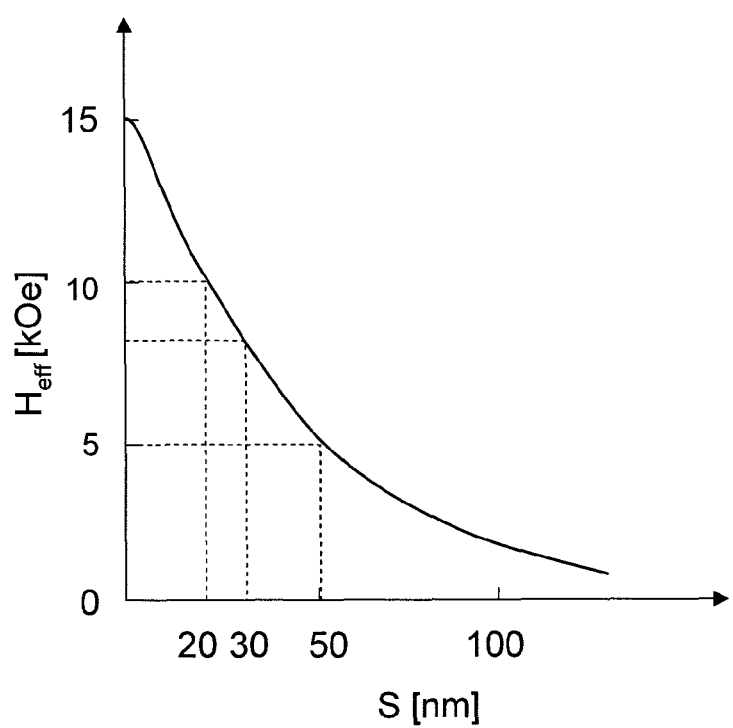
FIG. 21 is a diagram showing a relationship between the distance from the main pole and the magnetic field intensity.

The magnetic field intensity at the position where the optical near-field is generated can be increased by making the distance s between the main pole 2 and the vertex 20 at which the optical near-field is generated as small as possible. FIG. 21 shows a relationship between the distance s between the main pole 2 and the vertex 20 at which the optical near-field is generated and an effective magnetic field intensity $H_{eff}$ ($H_{eff}=H_x^{2/3}+H_y^{2/3}+H_z^{2/3}$ where x, y, z denote magnetic field components in the directions x, y, z, respectively) at the position where the optical near-field is generated. Here, the height $H_4$ of the main pole is set at 400 nm. As shown therein, the magnetic field intensity is reduced as the distance from the magnetic pole increases. To achieve higher recoding density, the thermally assisted magnetic recording requires media to have higher anisotropic magnetic field intensity to improve its thermostability. In this case, however, the magnetic field intensity required for recording also increases. A recording magnetic field intensity of 5 kOe or higher is needed to achieve a recording density of 1 $Tb/in^2$ or higher, a recording magnetic field intensity of 8 kOe or higher is needed to achieve a recording density of 3 $Tb/in^2$ or higher, and a recording magnetic field intensity of 10 kOe or higher is needed to achieve a recording density of 5 $Tb/in^2$ or higher. Accordingly, as shown in FIG. 21, it is preferable that the distance (s) between the main pole 2 and the vertex 20 at which the optical near-field is generated be set at 50 nm or shorter to achieve the recording density of 1 $Tb/in^2$ or higher, 30 nm or shorter to achieve the recording density of 3 $Tb/in^2$ or higher, and 20 nm or shorter to achieve the recording density of 5 $Tb/in^2$ or higher. Note that, if the distance s is too small, the optical near-field intensity is reduced due to the influence of the magnetic pole (the intensity is reduced as a result of interaction in which the electric charges gathering at the vertex 20 of the scatterer 1 and the electric charges gathering on the surface of the magnetic pole cancel out each other. The distance s may be set as large as possible within a range in which a sufficient recording magnetic field intensity can be obtained. In this embodiment, the distance s is set at 20 nm because the necessary magnetic field intensity is 10 kOe.

Figure 22:
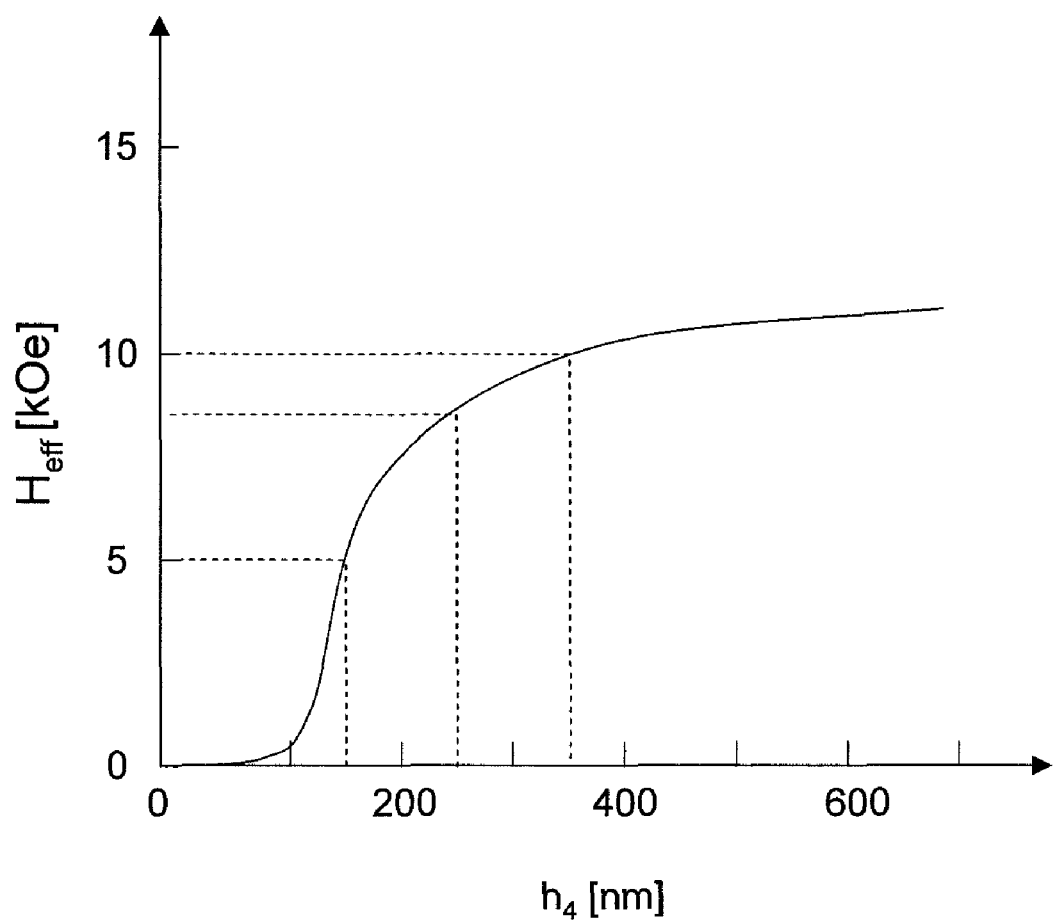
FIG. 22 is a diagram showing a relationship between the height of the main pole and the magnetic field intensity.

In the foregoing embodiment, if the height $h_4$ of the main pole 2 is set too small, a joint potion of the wide portion 27 of the magnetic pole with the main pole 2 has such a small area as to inhibit, to some extent, a flow of magnetic flux into the main pole 2, and accordingly the intensity of the magnetic field generated at the main pole tip end becomes weak. FIG. 22 shows a relationship between the height $h_4$ of the main pole and the effective magnetic field intensity $H_{eff}$ at the position where the optical near-field is generated. Here, the distance s between the main pole 2 and the vertex 20 at which the optical near-field is generated is set at 20 nm, and the distance $h_{12}$ between the thick magnetic pole 27 and the slider air bearing surface 17 is set at 100 nm. As shown in this drawing, if the height of the main pole becomes too small, the magnetic field intensity is weak. It is preferable that the height $h_4$ of the main pole be set at 150 nm or longer to generate the recording magnetic field intensity of 5 kOe or higher required to achieve the recording density of 1 Tb/in² or higher; the height $h_4$ of the main pole be set at 250 nm or longer to generate the recording magnetic field intensity of 8 kOe or higher required to achieve the recording density of 3 Tb/in² or higher; and the height $h_4$ of the main pole be set at 350 nm or longer to generate the recording magnetic field intensity of 10 kOe or higher required to achieve the recording density of 5 Tb/in² or higher.

Figure 6:
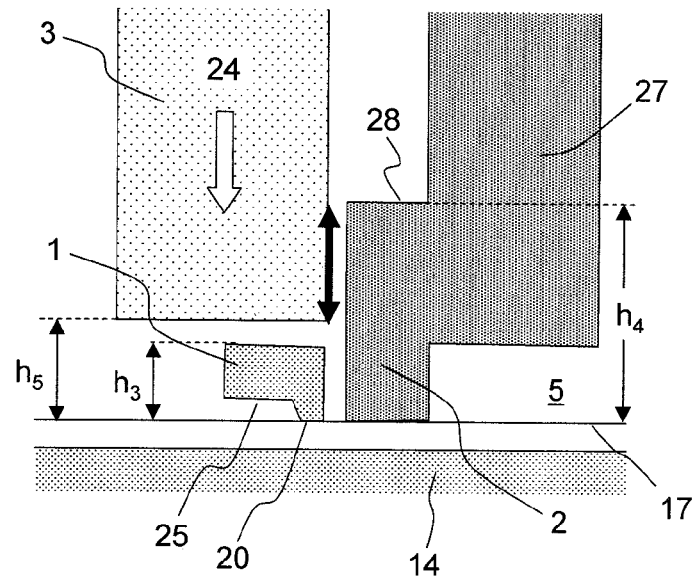
FIG. 6 includes cross sectional views showing conventional recording heads.
Figure 6:
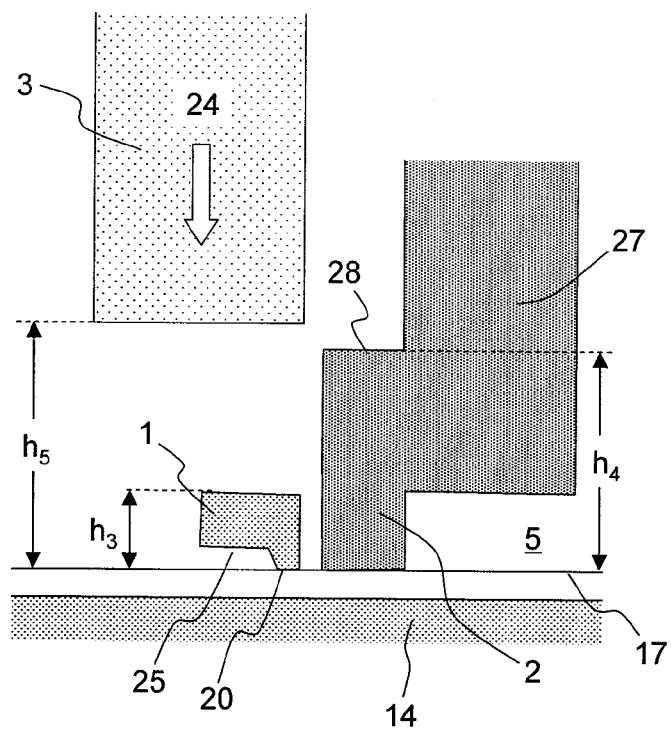

In the case where the scatterer for generating an optical near-field is installed in the vicinity of the main pole, the height $h_3$ of the scatterer in an element height direction is set smaller than the height $h_4$ of the main pole in the element height direction in a conventional example, as shown in FIG. 6(a). In this case, the intensity of the generated optical near-field is reduced for the following reasons.

Figure 7:
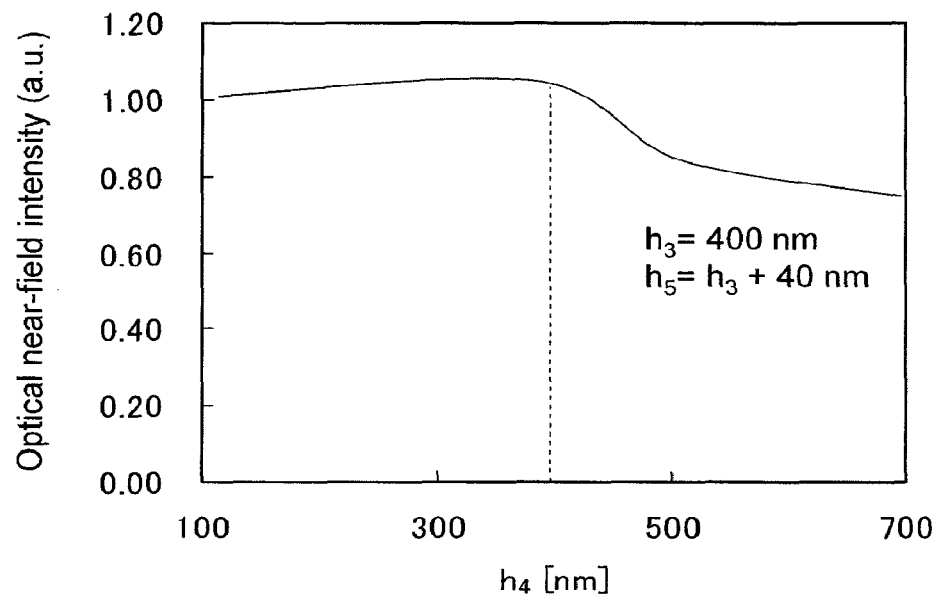
FIG. 7 includes diagrams each showing a relationship between the height of the main pole and the optical near-field intensity.
Figure 7:
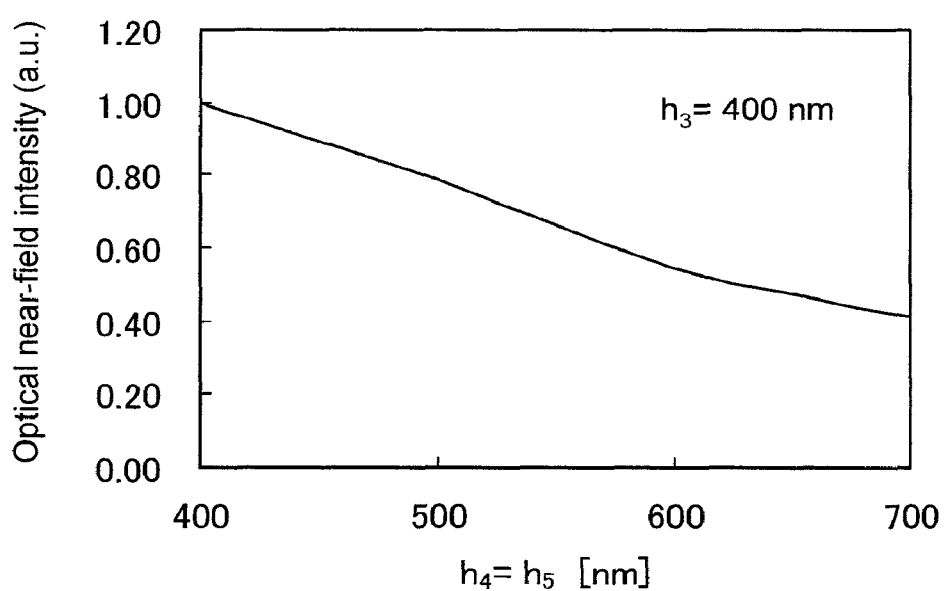

(i) In the case where the tip end of the waveguide core 3 is located at a level below an upper side of the main pole in the element height direction as shown in FIG. 6(a), evanescent light components leaking out to the clad portion of the waveguide incident on the magnetic pole and are absorbed or scattered by the magnetic pole, in a part indicated by a heavy arrow. Consequently, the amount of light reaching the scatterer is reduced and the intensity of the generated optical near-field is also reduced. FIG. 7(a) shows, as an example, a relationship between the height $h_4$ of the main pole and the optical near-field intensity in the case where the height $h_3$ of the scatterer is 400 nm, and the distance $h_5$ between the tip end of the waveguide core 3 and the slider air bearing surface 17 is larger by 40 nm than the height of the scatterer. As shown therein, it is apparent that the optical near-field intensity is reduced when the height $h_4$ of the main pole becomes larger than the height $h_3$ of the scatterer (400 nm).

(ii) The tip end of the waveguide core 3 may be located at a level above an upper side 28 of the main pole in the element height direction as shown in FIG. 6(b). In this case, however, the light exiting from the tip end of the waveguide core 3 are spread out before reaching the scatterer 1. As a result, the energy density of the light reaching the scatterer is reduced, and the intensity of the generated optical near-field also is reduced. FIG. 7(b) shows, as an example, a relationship between the height $h_4$ of the main pole and the optical near-field intensity in the case where the height $h_3$ of the scatterer is 400 nm, and the distance $h_5$ between the tip end of the waveguide core 3 and the slider air bearing surface 17 is equal to the height $h_4$ of the main pole. When the height $h_4$ of the main pole becomes larger than the height $h_3$ of the scatterer, the distance between the tip end of the waveguide core 3 and the scatterer increases so much that the energy density of light reaching the scatterer is reduced, which results in a reduction in the optical near-field intensity, as shown in this drawing.

Figure 5:
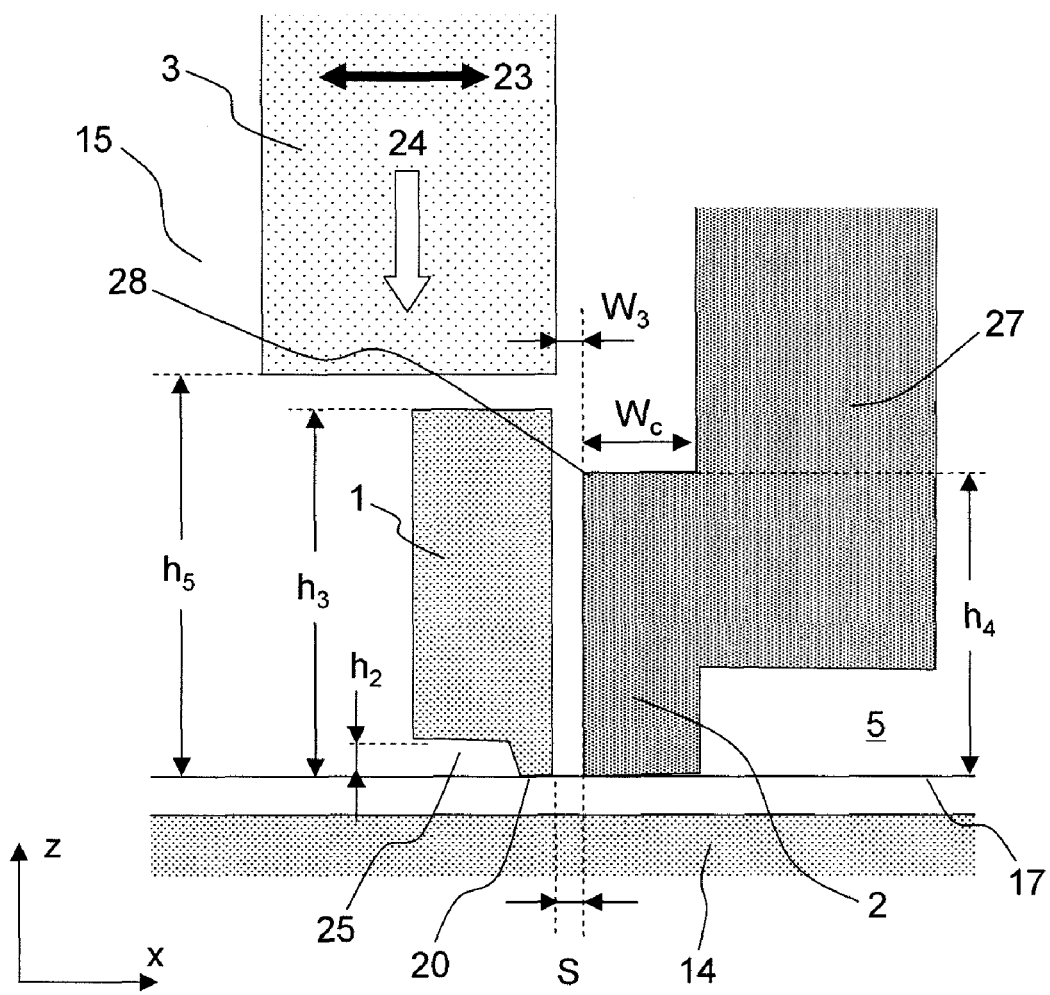
FIG. 5 is a cross sectional view showing the tip end of the main pole and the portion of the optical near-field transducer, which is viewed from the lateral side, in the case where the height of the scatterer is larger than the height of the main pole.

In this regard, in order to increase the optical near-field intensity, the present invention makes the height $h_3$, in the element height direction, of the scatterer 1 to generate the optical near-field substantially equal to the height $h_4$ of the main pole in the element height direction as shown in FIG. 3, or makes the height $h_3$ of the scatterer 1 to generate the optical near-field larger than the height $h_4$ of the main pole as shown in FIG. 5. Here, the distance $h_5$ between the tip end of the waveguide core 3 and the slider air bearing surface 17 is set substantially equal to or larger than the height $h_4$ of the main pole 2 (the height of the edge of the magnetic pole on the waveguide side). With this structure, the tip end of the waveguide core 3 does not have to be at a level below the main pole upper side 28, nor do the waveguide core 3 and the main pole 2 have to be arranged side by side. Consequently, the propagation loss inside the waveguide is reduced, and the light use efficiency as a whole is improved. Here, in this case, the light energy propagates as plasmons inside the scatterer 1 from the main pole upper side 28 to the main pole tip end. More specifically, when the upper surface of the scatterer 1 is irradiated with light, plasmons are excited on the upper surface of the scatterer. These plasmons propagate to the lower side (air bearing surface side), and a strong optical near-field is generated at the tip end portion 20 of the scatterer. As a result, without use of the waveguide, the light can be transmitted to the slider air bearing surface side in an area from the main pole upper side 28 to the main pole tip end.

In the structure of the present invention, the intensity of the optical near-field generated at the vertex 20 depends on the height $h_3$ of the scatterer 1. To be more specific, the plasmons propagating in the z direction inside the scatterer are reflected by the lower side and the upper side of the scatterer, and cause interference inside the scatterer. In this connection, if the height $h_3$ of the scatterer 1 is optimized, the intensity of the optical near-field generated at the vertex 20 can be increased.

Figure 8:
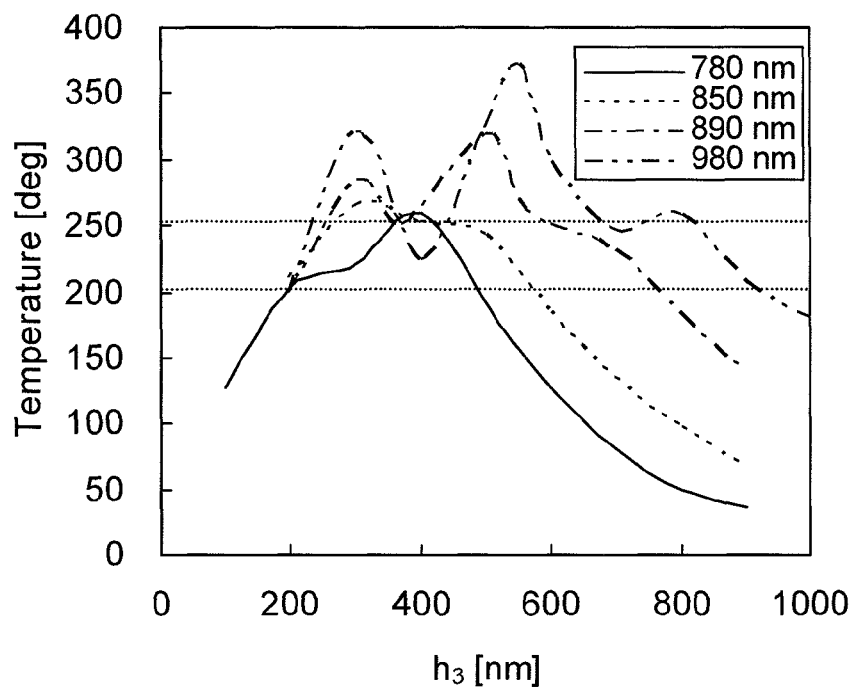
FIG. 8 includes diagrams each showing a relationship between the height of the scatterer and the temperature of the medium surface.
Figure 8:
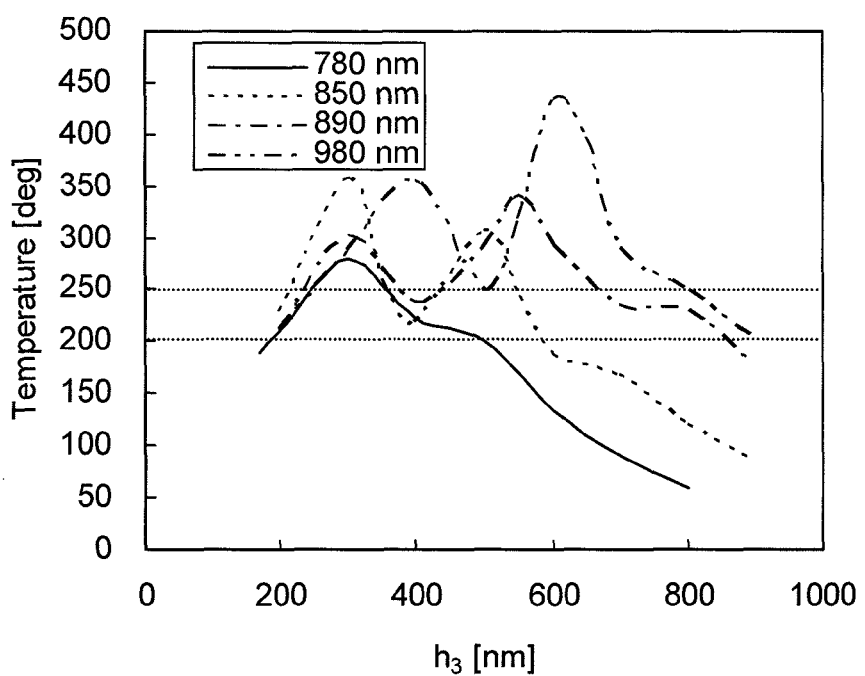

FIGS. 8(a) and 8(b) are diagrams each showing a relationship between the height $h_3$ of the scatterer 1 and the temperature of a medium surface in the case where gold is used as a material for the scatterer. Here, the wavelength of light incident on the optical near-field transducer is set at 780 nm, 850 nm, 890 nm or 980 nm, and the intensity thereof is set at 10 mW. The length of the scatterer 1 in the x direction ($W_a$ in FIG. 4) is adjusted to excite the plasmon resonance, i.e., is set at 80 nm in the case of the wavelength of 780 nm or 850 nm, 90 nm in the case of the wavelength of 890 nm, or 100 nm in the case of the wavelength 980 nm. The material for a scatterer surrounding area (equivalent to the material for the waveguide clad 15) is $Al_2O_3$ (refractive index 1.63) in FIG. 8(a) or $SiO_2$ (refractive index 1.45) in FIG. 8(b). For the recording medium, FePt is used as a material for the recording layer. As shown in FIGS. 8(a) and 8(b), the temperature of the medium surface depends on the height $h_3$ of the scatterer 1. Specifically, the temperature of the medium surface and the optical near-field intensity have a proportional relationship. Since the optical near-field intensity depends on the height $h_3$ of the scatterer 1, the temperature of the medium surface depends on the height $h_3$ of the scatterer 1. In addition, the relationship between the temperature of the medium surface and the height $h_3$ of the scatterer 1 depends on the wavelength of the incident light and the material for the scatterer surrounding area.

Here, description is provided for the relationships of the optimal range of the height $h_3$ of the scatterer 1 with the wavelength of the incident light and the material for the scatterer surrounding area.

A medium heating temperature required for recording needs to be made higher as the recording density increases. To increase the recording density, the diameter of particles included in the medium needs to be made small enough to maintain the signal-to-noise ratio of reproduced signals at a sufficient value. The smaller the diameter of particles is, the higher the coercivity of the medium needs to be made. Then, in general, the higher coercivity of a medium makes the Curie temperature higher. For this reason, there is need to raise the medium heating temperature required for recording. The medium needs to be heated to a temperature at approximately 200° C. or higher for achieving the recording density of 1 Tb/in² or higher, and at approximately 250° C. or higher for achieving the recording density of 5 Tb/in² or higher. For example, in FIG. 8(a), when the wavelength is 780 nm, the height $h_3$ of the scatterer 1 needs to be set at 200 nm to 500 nm, both inclusive, in order to heat the medium to a temperature at 200° C. or higher.

Figure 9:
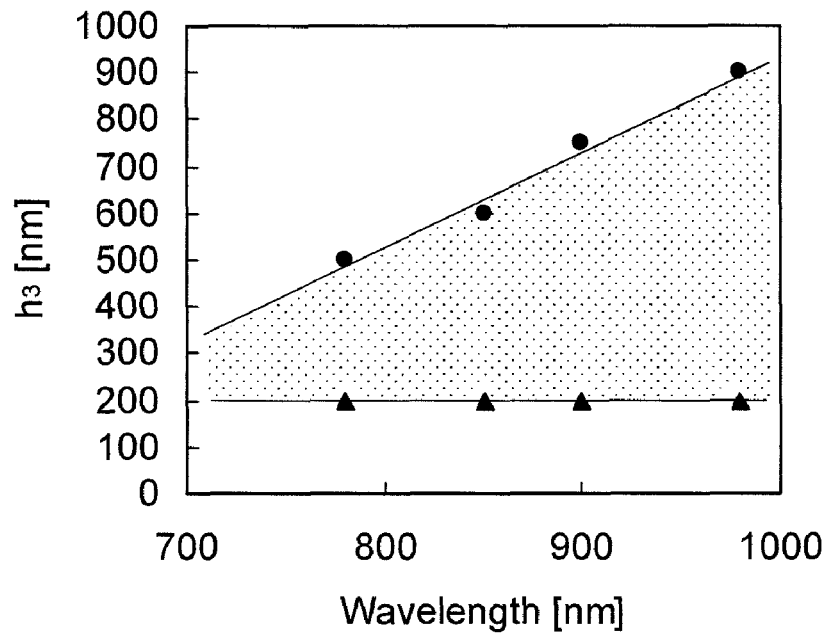
FIG. 9 includes diagrams showing an optimal range of the height of the scatterer.
Figure 9:
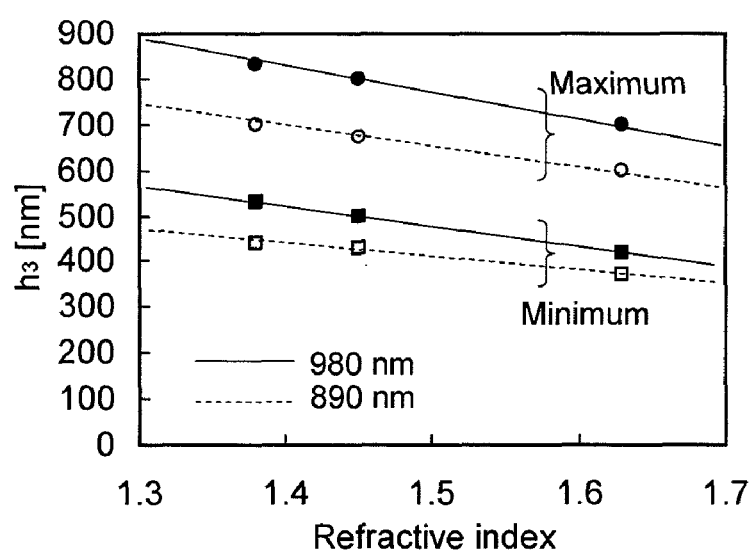

FIG. 9(a) is a diagram showing a relationship between the wavelength of incident light and the range of the height $h_3$ of the scatterer 1 necessary to heat the medium to a temperature at 200° C. or higher, the relationship obtained from FIG. 8(a). A circle denotes the maximum value of each optimal range, and a triangle denotes the minimum value of each optimal range. As shown in FIG. 9(a), the relationship between the wavelength λ and each of the maximum value $h_{max}$ and the minimum value $h_{min}$ of the range of the height $h_3$ of the scatterer 1 necessary to heat the medium to a temperature at 200° C. or higher can be approximated to a straight line, that is, the maximum value is $h_{max}$=2.06λ-1120 [nm] whereas the minimum value is $h_{min}$=200 [nm].

In the case of FIG. 8(b) (the case where the material for the scatterer surrounding area is $SiO_2$), the optimal ranges obtained in the same manner as that described above are almost the same results as in the case where the material for the scatterer surrounding area is $Al_2O_3$ in FIG. 8(a).

In FIGS. 8(a) and 8(b), two peaks appear (two resonance modes exist) in the case where the wavelength is 890 nm or longer. Further, in the peak with a larger height $h_3$ of the scatterer 1, the medium heating temperature becomes maximum and a temperature significantly larger than 250° C. that is required to achieve the recoding density of 5 Tb/in² or higher can be obtained. Here, a range where the temperature is at 250° C. or higher is figured out in the peak with the larger height $h_3$ of the scatterer 1. The figured-out range depends on the wavelength of incident light and the material for the scatterer surrounding area (refractive index of the material).

FIG. 9(b) is a diagram showing relationships between the refractive index of the material for the scatterer surrounding area and the ranges of the height $h_3$ of the scatterer 1 necessary to heat the medium to a temperature of 250° C. or higher when the wavelength of incident light is 890 nm and 980 nm. A black circle and a black square denote the maximum value and the minimum value, respectively, for the case of the wavelength of 980 nm; whereas a white circle and while square denote the maximum value and the minimum value, respectively, for the case of the wavelength of 890 nm. As shown therein, the relationship between each of the maximum value and the minimum value and the refractive index n can be approximated to a straight line. In the case of the wavelength of 890 nm, the maximum value $h_{890max}$ is $h_{890max}$=−397 n+1250 [nm], and the minimum value $h_{890min}$ is $h_{890min}$=−291 n+835 [nm]. In the case of the wavelength of 980 nm, the maximum value $h_{980max}$ is $h_{980max}$=−527 n+1560 [nm], and the minimum value $h_{980min}$ is $h_{980min}$=−441 n+1118 [nm]. Note that the maximum value $h_{max}$ and the minimum value $h_{min}$ in the case where the wavelength λ is other than 890 nm and 980 nm may be approximated in the following way using the aforementioned values (a unit is nm).

$$h_{max} = \frac{\lambda - 890}{980 - 890}(h_{980max} - h_{890max}) + h_{890max} =$$
$$\frac{\lambda - 890}{90}(-130n + 310) - 397n + 1250$$

$$h_{min} = \frac{\lambda - 890}{980 - 890}(h_{980min} - h_{890min}) + h_{890min} =$$
$$\frac{\lambda - 890}{90}(-150n + 283) - 291n + 835$$

Figure 10:
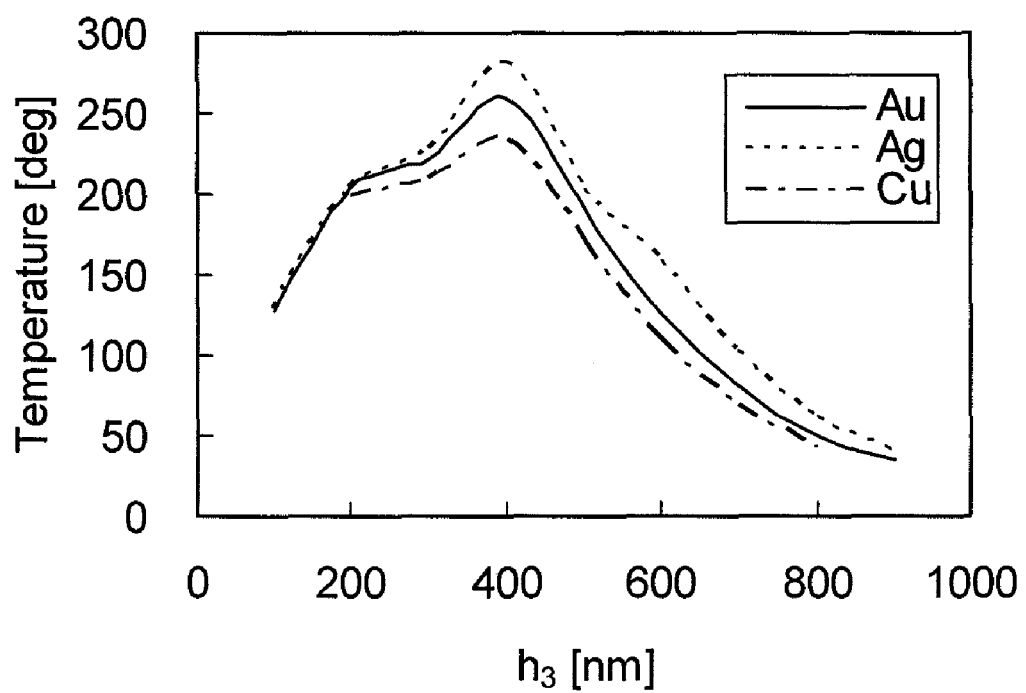
FIG. 10 is a diagram showing a relationship between the height of the scatterer and the temperature of the medium surface in each of the cases where gold, silver, and copper are used as material for the scatterer.

In the foregoing embodiment, gold is used as the material for the scatterer, but any other conductive material may be used instead. Here, a material with high conductivity, such as gold, silver, copper or an alloy obtained by mixing any of them is preferably used in order that the scatterer can generate a strong optical near-field. FIG. 10 shows a relationship between the temperature of the medium surface and the height $h_3$ of the scatterer 1 in the case where the wavelength is 780 nm and the material for the scatterer surrounding area is $Al_2O_3$. As shown in FIG. 10, the ranges of the optimal values of the height $h_3$ of the scatterer 1 are almost the same as in the case of gold, although there is a slight difference in the temperature value. The optimal value range in the case of using any of alloys of gold, silver, and copper can be also considered similar to that in the case of using gold.

Figure 11:
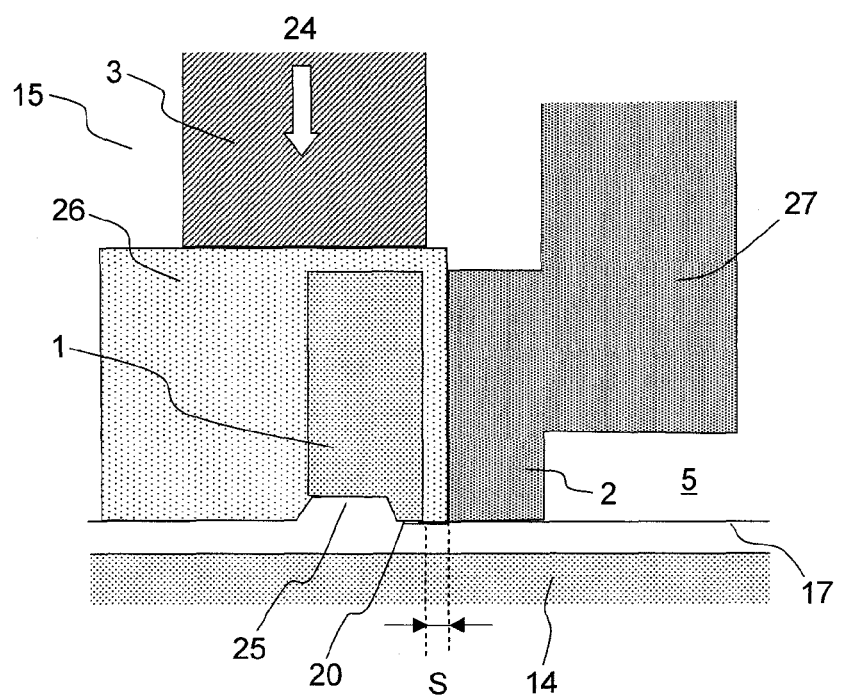
FIG. 11 includes views showing a case where the scatterer surrounding area is formed of a material different from that of the waveguide clad.
Figure 11:
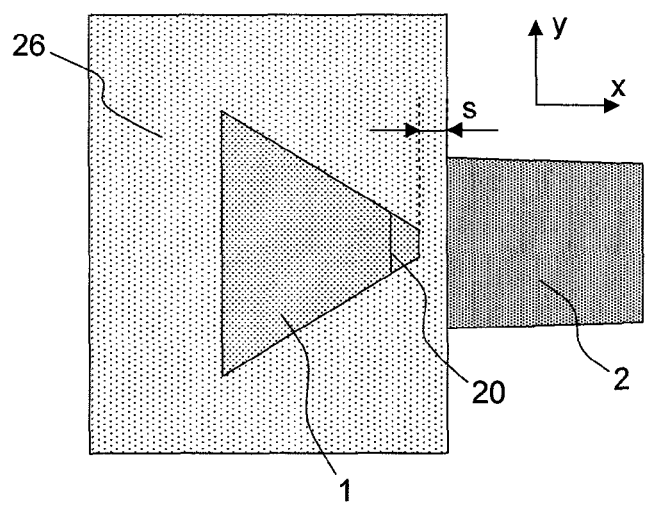

In the foregoing embodiment, the material for the waveguide clad 15 and the material for the scatterer surrounding area are the same, but the material for a scatterer surrounding portion 26 and the material for the waveguide clad 15 may also be different from each other as shown in FIGS. 11(a) and 11(b). In an embodiment in FIGS. 11(a) and 11(b), the material for the waveguide clad 15 is $Al_2O_3$ whereas the material for the scatterer surrounding portion 26 is $SiO_2$. In a conventional magnetic head, the periphery of the magnetic pole is covered with $Al_2O_3$. For this reason, use of $Al_2O_3$ for the waveguide clad makes it easier to manufacture the waveguide beside the magnetic head. On the other hand, use of a material having a smaller refractive index, such as $SiO_2$, as the material for the scatterer surrounding area results in the higher intensity of the generated optical near-field. If the refractive index of the dielectric substance surrounding the scatterer is large, a high degree of polarization occurs in the dielectric substance. The polarization in the dielectric substance cancels out the polarization occurring due to an uneven distribution of electric charges inside the scatterer. As a result, the intensity of the plasmons generated in the scatterer is reduced and accordingly the optical near-field intensity is reduced. The optical near-field intensity can be increased if the refractive index of the material for the scatterer surrounding area is made small as shown in FIGS. 11(a) and 11(b).

Figure 12:
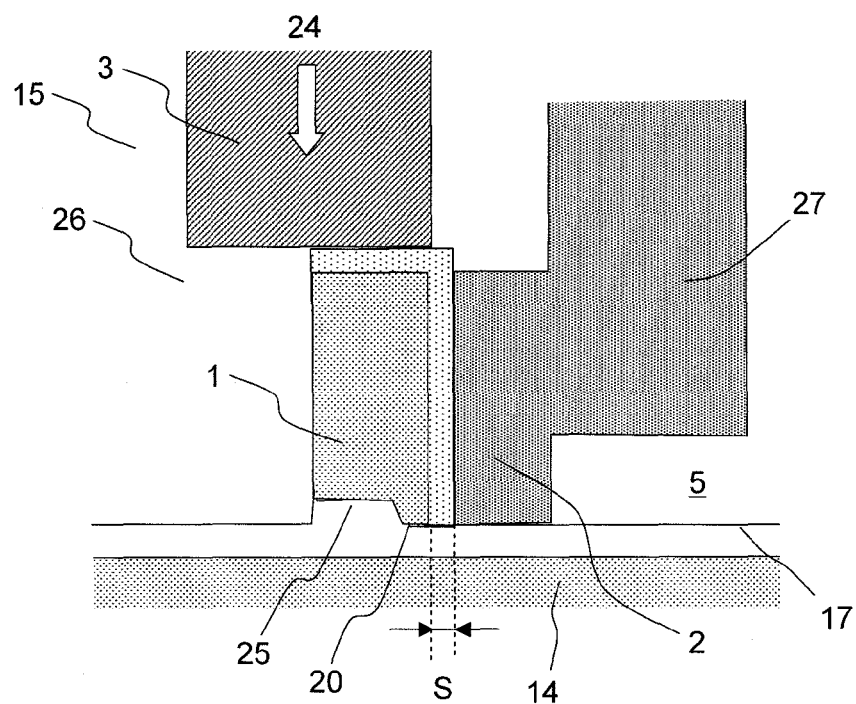
FIG. 12 includes views showing a case where a portion neighboring the scatterer in the scatterer surrounding area is formed of a material different from that for the other portion.
Figure 12:
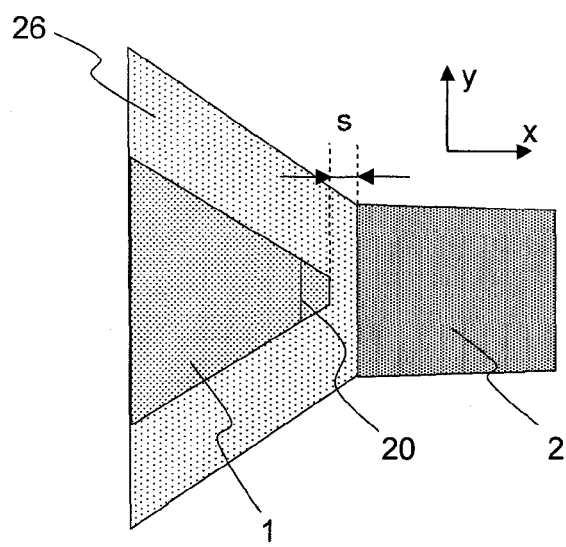

As shown in FIGS. 12(a) and 12(b), materials in contact with the scatterer 1 may differ from place to place. In this embodiment, the material for a portion around the tip end potion 20 of the scatterer is $SiO_2$, and the material on the side opposite to the vertex is $Al_2O_3$. The optical near-field intensity can be increased with use of $SiO_2$ as the material for the scatterer surrounding area, but a temperature rise of the scatterer is also increased since $SiO_2$ has such a small thermal conductivity that heat generated by the light absorbed by the scatterer cannot rapidly dissipate from the scatterer. Such temperature rise can be reduced by using $Al_2O_3$ with a large thermal conductivity partly as described above. In the case where the materials for the scatterer surrounding area are different from place to place, the value of the refractive index in the formula for the optimal range of the height $h_3$ of the scatterer 1 may be assigned an average value of the refractive indices of all the materials. Here, although the material for the portion around the tip end potion 20 of the scatterer is $SiO_2$ and the material on the side opposite to the vertex is $Al_2O_3$ in the above example, the material for the portion around the tip end potion 20 of the scatterer may be $Al_2O_3$, and the material on the side opposite to the vertex may be $SiO_2$, inversely.

Figure 13:
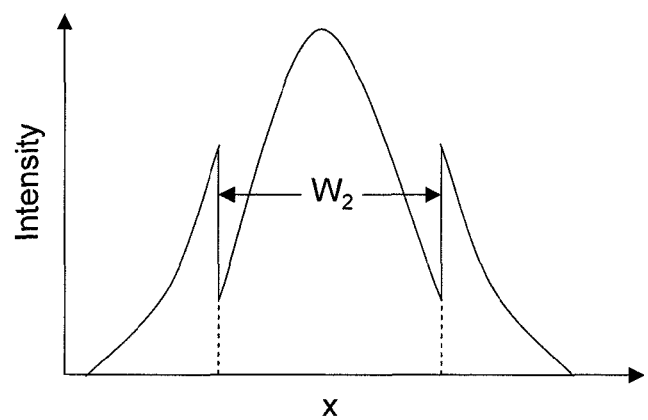
FIG. 13 includes diagrams showing a positional relationship between the waveguide and the scatterer.
Figure 13:
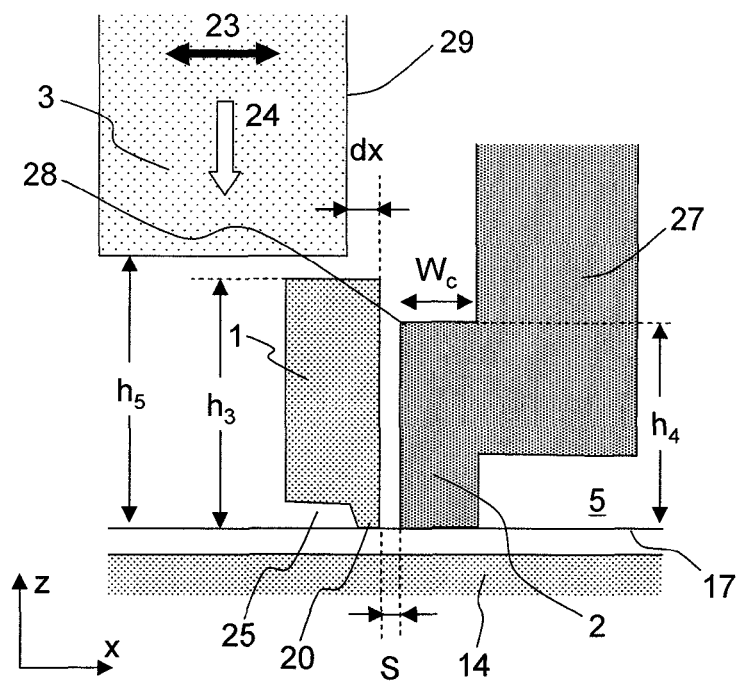
Figure 14:
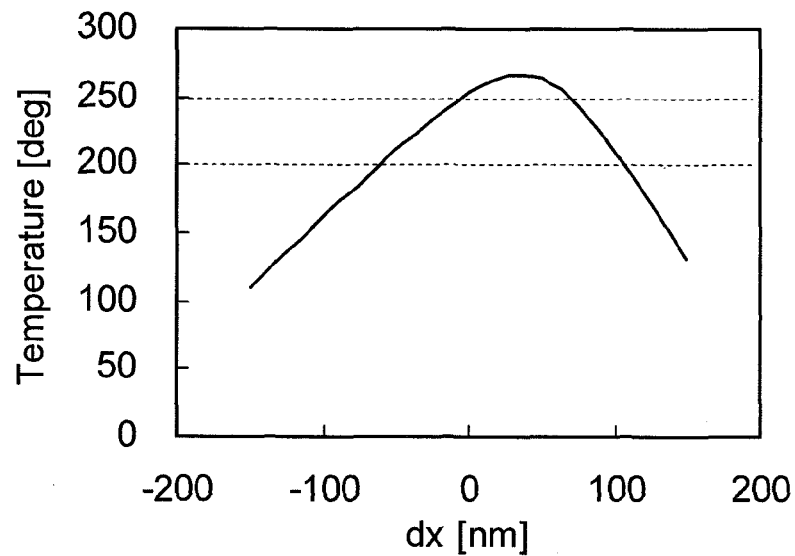
FIG. 14 is a diagram showing a relationship between the temperature of the medium surface and the distance between the edge portion of the waveguide core and the tip end portion of the scatterer.

In the foregoing embodiment, the scatterer 1 is placed around the interface between the waveguide core 3 and clad 15. This placement enables efficient conversion of the light transmitted through the waveguide into the optical near-field generated by the scatterer. FIG. 14 shows a relationship between the temperature of the medium surface and a distance dx in the x direction between an edge 29 of the waveguide core 3 in the x direction (see FIG. 13(b)) and the vertex portion 20 of the scatterer. Here, a plus sign is given to the distance dx in the case where the vertex 20 of the scatterer protrudes from the edge 29 of the core to the clad. Here, the thick magnetic pole 27 for transmitting the magnetic field from the coil is assumed to be absent. When the scatterer is placed around the edge 29 of the waveguide core 3 in the x direction, rather than at the center of the waveguide, a stronger optical near-field is generated and the temperature of the medium surface is higher. FIG. 13(a) shows an intensity distribution inside the waveguide in the x direction. As shown in this drawing, evanescent light leaks out to the waveguide clad portion. The wavenumber of the optical near-field generated by the scatterer is an imaginary number, and the wavenumber of the evanescent light leaking out to the waveguide clad portion is also an imaginary number. For this reason, it is considered that the evanescent light leaking out to the clad portion is so similar in wavenumber to the optical near-field that the evanescent light can be converted into the optical near-field efficiently.

An optimal range of the distance dx between the edge 29 of the waveguide core 3 in the x direction and the vertex portion 20 of the scatterer is −50 nm to 100 nm, both inclusive, where the optimal range is determined with respect to the medium temperature of 200° C. that is necessary to achieve the recording density of 1 Tb/in$^2$. Instead, the optimal range is −10 nm to 70 nm, both inclusive when determined with respect to the medium temperature of 250° C. that is necessary to achieve the recording density of 5 Tb/in$^2$.

Figure 15:
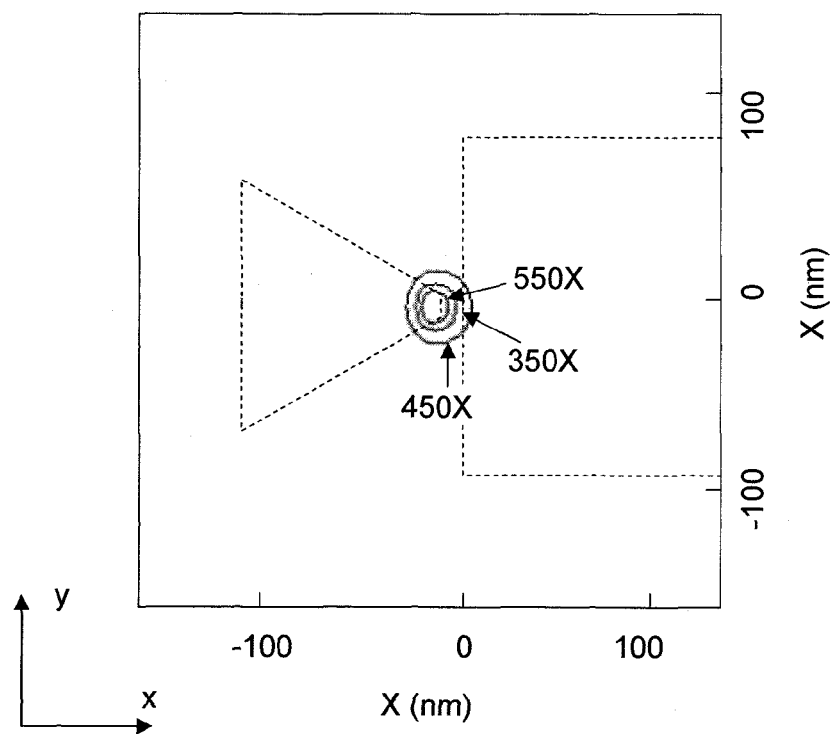
FIG. 15 is a distribution diagram of optical near-field intensity on a medium surface.

FIG. 15 shows an optical near-field intensity distribution observed on a surface of a recording medium when an optical near-field is generated by using an optimal structure in the foregoing embodiment. Here, the wavelength of incident light is 980 nm, the material for the scatterer 1 is gold, the length of the scatterer 1 in the x direction ($W_a$ in FIG. 4) is 100 nm, the height $h_3$ in the element height direction is 550 nm, and the height $h_4$ of the main pole is 550 nm. The material for the surrounding area of the waveguide is $Al_2O_3$. The distance dx between the edge 29 of the waveguide core 3 and the vertex portion 20 of the scatterer is 50 nm. In this drawing, the value of the optical near-field intensity is represented as an intensity ratio of the optical near-field intensity to the incident light intensity set at 1. As shown in this drawing, the strong optical near-field is generated in the vicinity of the vertex 20 of the scatterer and the intensity thereof is approximately 550 times as high as the incident light intensity.

Figure 16:
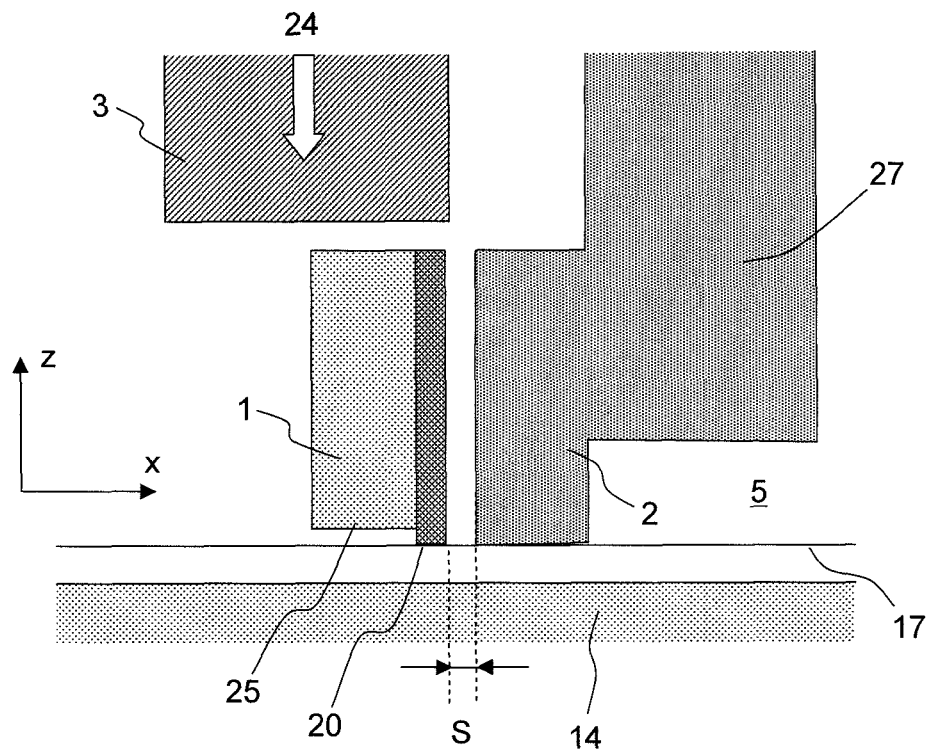
FIG. 16 includes views showing a case where the vertex of the scatterer at which the optical near-field is generated is formed of a material different from that for the other portion thereof.
Figure 16:
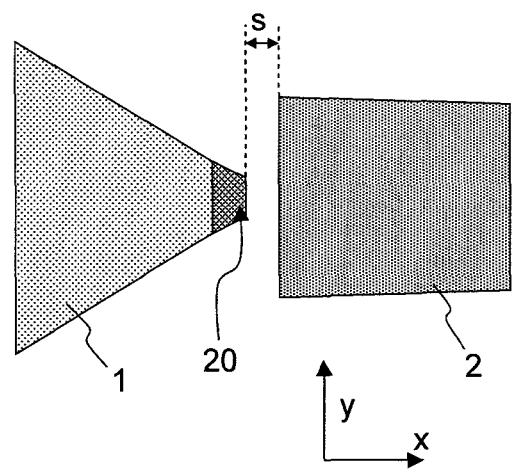

The material forming the scatterer may differ from place to place. In an embodiment shown in FIGS. 16(a) and 16(b), a material for the vertex portion 20 at which the optical near-field is generated is different from a material used for the other portion of the scatterer, so that the material for the tip end portion is a material having higher hardness than the material for the body portion. With use of such materials, the vertex 20 at which the optical near-field is generated is more unlikely to be damaged when the recording head hits a recording medium due to a shock or the like applied to the apparatus. In this embodiment, the material for the body portion of the scatterer is gold and the material for the tip end portion 20 is tungsten. Instead of tungsten, another kind of material such as molybdenum, chromium, titanium, or platinum maybe used as the material for the tip end portion.

Figure 17:
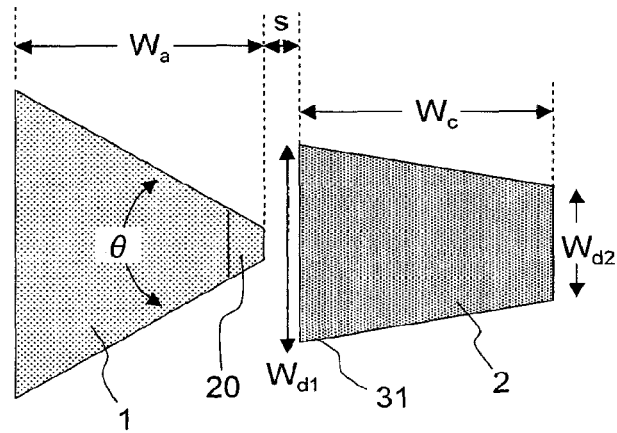
FIG. 17 includes views each showing a cross sectional shape of the tip end of the main pole.
Figure 17:
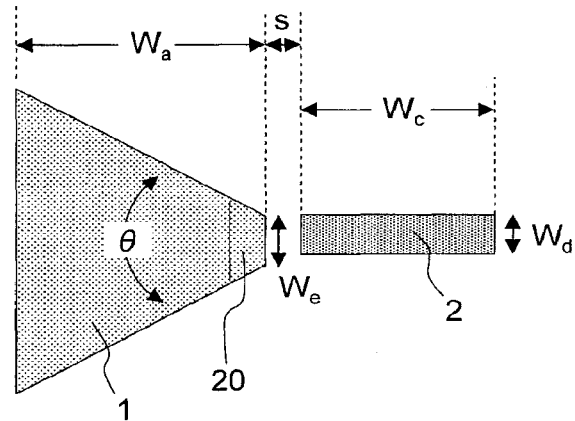
Figure 17:
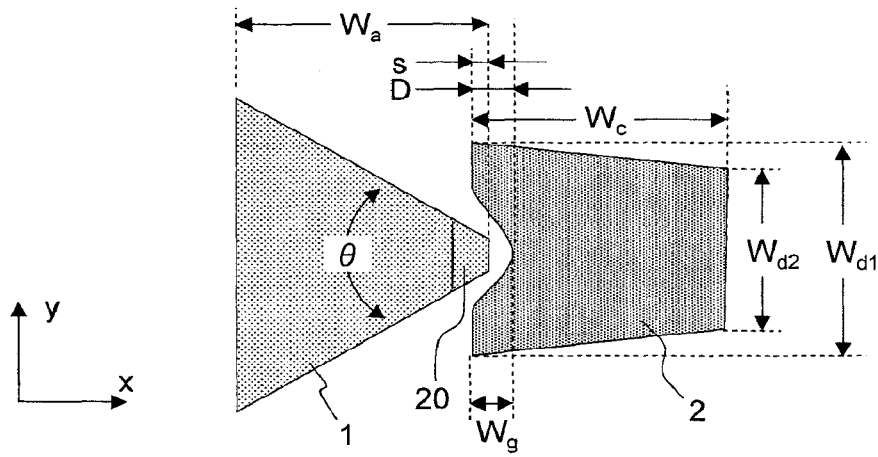

In the foregoing embodiment, the cross section of the main pole has a rectangular shape as shown in FIG. 4, but may have a trapezoid shape as shown in FIG. 17(a). When the main pole is formed with such a trapezoid cross sectional shape, the magnetic field intensity on a side closer to the heating point heated by the optical near-field can be increased. Thus, recoding on a medium having higher coercivity is enabled, and thereby an increase in the recording density is achievable. In this embodiment, the width $W_{d1}$ of the magnetic pole on the side closer to the vertex 20 at which the optical near-field is generated is 150 nm, whereas the width of the magnetic pole on the opposite side is 100 nm.

In addition, when the main pole is formed with a rectangular or trapezoid cross sectional shape, the width $W_d$ of the main pole 2 may be substantially equal to the width of the vertex of the scatterer 1, or may be smaller than $W_e$. At the tip end of the magnetic pole, a strong magnetic field is apt to occur at an edge portion 31 in FIG. 17(a). For this reason, if $W_d > W_e$, data on an adjacent track may be erased due to application of the strong magnetic field to the adjacent track. In contrast, if $W_d < W_e$ or $W_d = W_e$, the application of the magnetic field to the adjacent track is prevented. In this embodiment, the widths are set at $W_d = W_e = 20$ nm.

Figure 23:
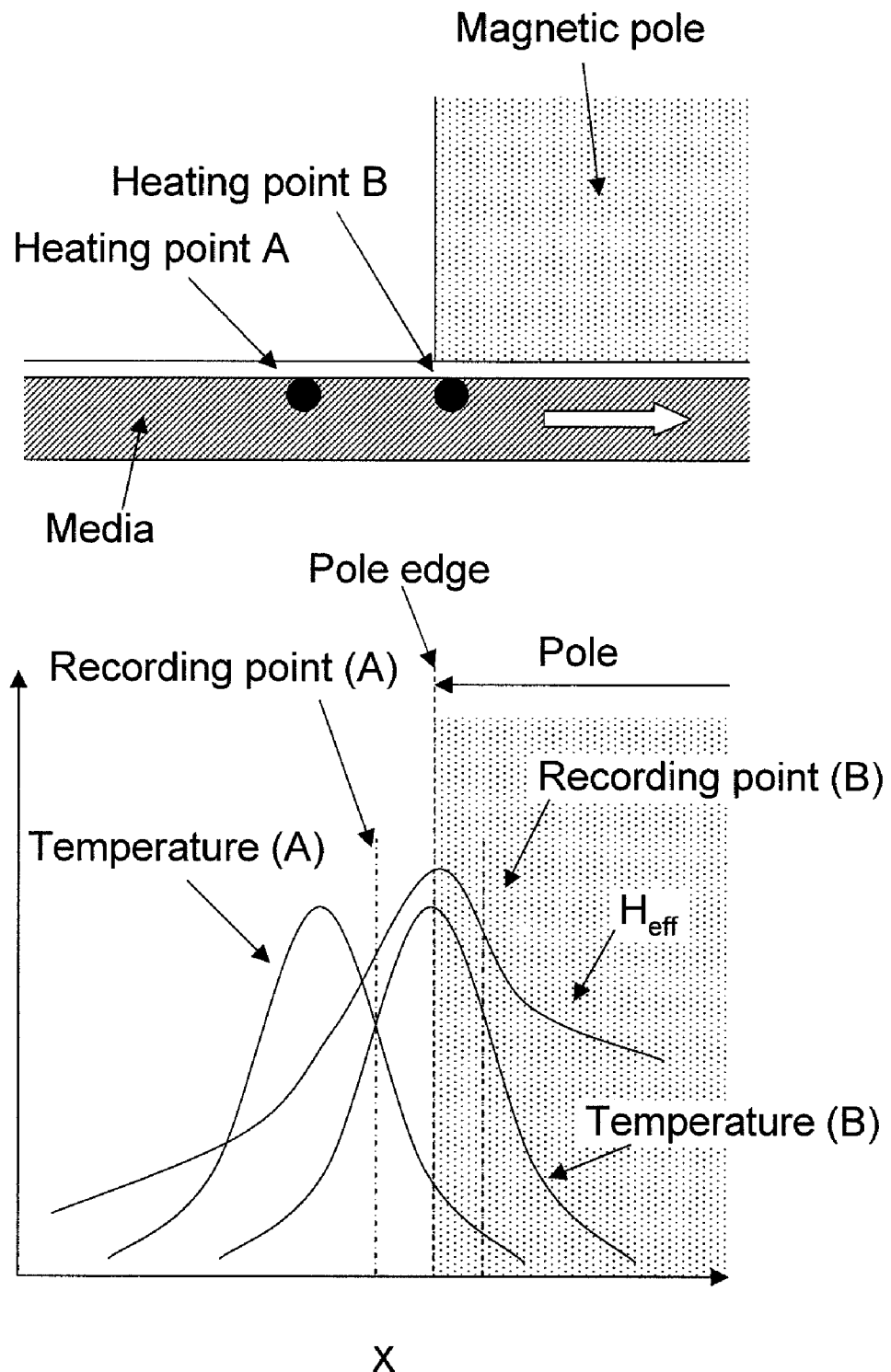
FIG. 23 is a diagram showing a relationship between the effective magnetic field intensity distribution and the heating point.

The main pole 2 may be depressed in the vicinity of the vertex 20 at which the optical near-field is generated, as shown in FIG. 17(c). When a part of the main pole is depressed, the heating point heated by light can be made closer to a center portion of the main pole. In this case, the recording density can be increased for the following reasons.
(i) The magnetic field intensity increases toward the edge of the main magnetic. Since use of the main pole depressed partly allows the heating point heated by light to be closer to a center portion of the main pole, the magnetic field intensity at the heating point can be increased. As a result, recoding on a medium having higher coercivity (or anisotropic magnetic field) is enabled, and thereby an increase in the recording density is achievable.
(ii) In the thermally assisted magnetic recording, a boundary (recording point) between recoding bits is determined by a position at which a temperature gradient dT/dx is minimized where T denotes a temperature. At this time, as the gradient $dH_{eff}/dx$ of the effective magnetic field intensity $H_{eff}$ in the recording point becomes smaller, the boundary between the recording bits becomes clearer and accordingly a higher recoding density is achieved. The effective magnetic field intensity ($H_{eff}$) increases at the edge portion of the main pole as shown in FIG. 23. In the case where the heating point is outside the main pole (heating point A), the magnetic field gradient at the recording point is plus. In contrast, in the case where the heating point is closer to the center of the main pole (heating point B), the magnetic field gradient at the heating point is minus, and the point where dT/dx become minimum and the point where $dH_{eff}/dx$ becomes minimum can be made to coincide with each other. For this reason, the boundary between the recording bits is clearer and accordingly a higher recoding density is achieved.

In this embodiment, the widths of the tip end of the main pole are set at $W_c = 150$ nm and $W_{d1} = W_{d2} = 120$ nm, and a depressed amount (D) of the depressed portion is set at 50 nm. The distance (s) from the vertex at which the optical near-field is generated to the edge of the main pole is −10 nm (a plus sign is given as the distance s for the case where the vertex at which the optical near-field is generated is outside the main pole). In addition, in order to increase the magnetic field intensity at the recording point, the tip end of the main pole may be formed with a trapezoid cross sectional shape, as shown in FIG. 17(a), and the widths may be set at $W_c = 150$ nm, $W_{d1} = 120$ nm and $W_{d2} = 100$ nm.

Figure 18:
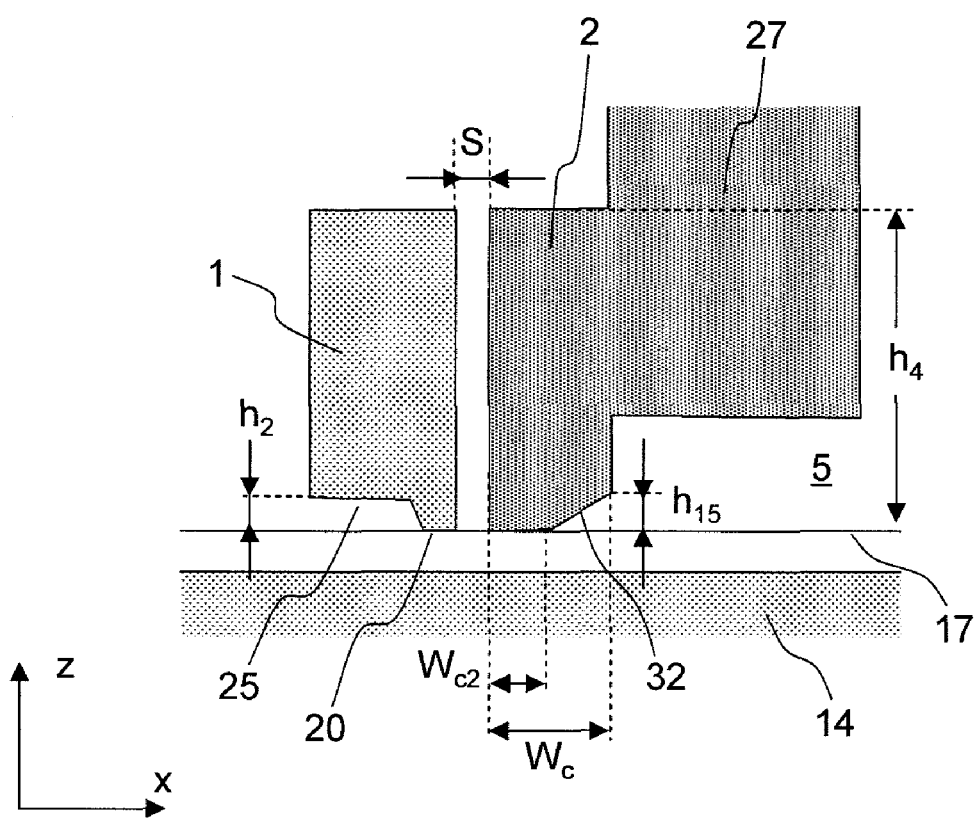
FIG. 18 is a view showing a case where a recess is formed at the tip end of the main pole.

In the foregoing embodiment, a recess 32 may be formed in the tip end of the main pole 2 as shown in FIG. 18. With the recess thus formed, the magnetic flux inside the main pole is gathered on the side closer to the generation point of the optical near-field, and thereby is capable of increasing the magnetic field intensity at the generation point of the optical near-field. In this embodiment, the widths of the tip end of the main pole are set at $W_c$=150 nm and $W_d$=100 nm, the width of a portion where the recess is not formed is set at $W_{c2}$=50 nm, and the height $h_{15}$ of the recess is set at 50 nm.

Figure 19:
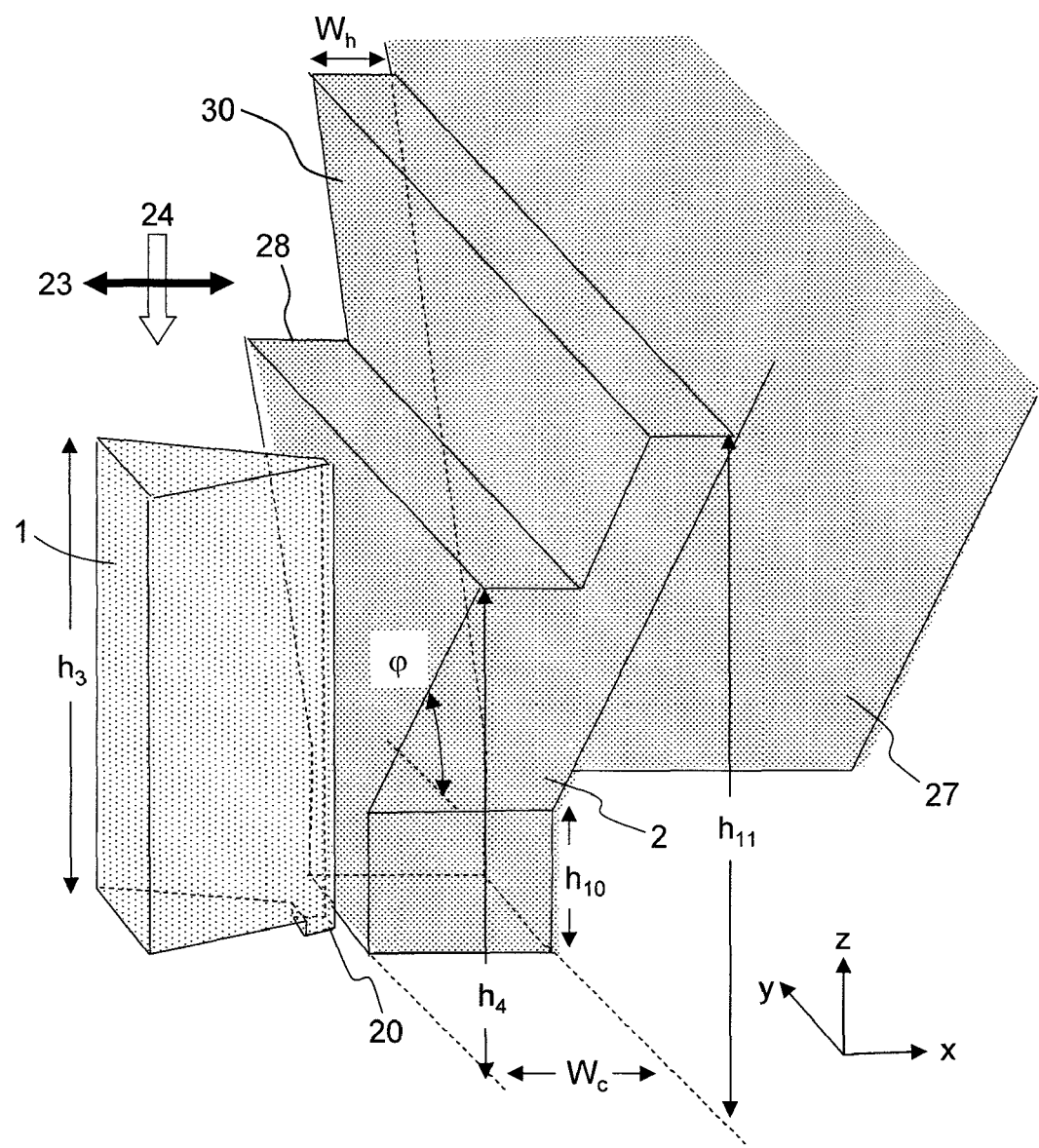
FIG. 19 is a view showing a case where a thin soft magnetic layer is formed between the main pole and the magnetic pole for transmitting a magnetic flux generated by a coil.

In the foregoing embodiment, as shown in FIG. 19, a thin soft magnetic layer 30 may be formed between the main pole upper side 28 and the magnetic pole 27 for transmitting the magnetic flux generated by the coil. The layer thus formed facilitates a flow, into the main pole 2, of the magnetic flux inside the magnetic pole 27 for transmitting the magnetic flux generated by the coil, and thereby the intensity of the magnetic field generated at the tip end of the main pole can be increased. In this case, since the thin soft magnetic layer 30 is located far from the waveguide core 3, the propagation loss of the waveguide is not increased by the thin soft magnetic layer 30. In this embodiment, at the tip end of the main pole, the widths of the main pole are set at $W_c$=200 and $W_d$=100 nm, and the height of the main pole (the distance to the air bearing surface from the edge on the side closer to the scatterer above the scatterer) is set at 300 nm. The distance ($h_{11}$) from an upper side of the thin soft magnetic layer 30 to the air bearing surface is set at 1.5 μm. When the thickness ($W_h$) of the thin soft magnetic layer 30 in the x direction is too large, the thin soft magnetic layer 30 is so close to the waveguide as to cause a propagation loss in the waveguide. In order to avoid the occurrence of the propagation loss, it is preferable that a difference between the width ($W_c$) of the main pole in the x direction and the thickness ($W_h$) of the thin soft magnetic layer 30 in the x direction should be 50 nm or longer. In this embodiment, the thickness ($W_h$) of the thin soft magnetic layer 30 in the x direction is set at 100 nm. The same material as the main pole is used as the material for the thin soft magnetic layer.

FIG. 20 shows a whole view of a recording device using a recording head of the present invention. An air bearing slider 5 is fixed to a suspension 13, and is positioned at a desired track position on a magnetic disc 14 by an actuator including a voice coil motor 49. An air bearing pad is formed on a surface of the head, and the head is floated above the magnetic disc 14 with a floating height of 10 nm or shorter. The magnetic disc 14 is fixed to a spindle driven to rotate by a motor, and thereby is rotated. A semiconductor laser 55 is fixed on a submount 51 by soldering, and the submount 51 is placed at the base (a portion called an e-block) of an arm to which the suspension is attached. A driver for the semiconductor laser 55 is placed on a circuit board 52 arranged beside the e-block. A driver for the magnetic head is also mounted on the circuit board 52. The submount 51 on which the semiconductor laser 55 is mounted may be placed directly on the e-block or may be placed on the circuit board 52 for driver. Light exiting from the semiconductor laser 55 is coupled to a waveguide 10 with the waveguide 10 placed in direct contact with the semiconductor laser, or with a lens placed between the waveguide 10 and the semiconductor laser. In this regard, the waveguide 10, the semiconductor laser 55, and an element and component for coupling them together may be integrated as a module, and the module may be placed on the e-block or on the circuit board beside the e-block. The inside of the module may be hermetically sealed for elongating the lifespan of the semiconductor laser 55. In addition, the waveguide 10 may be integrated on the suspension. To be more specific, when an electric wire for supplying power to the magnetic head is formed on the suspension, the waveguide may be formed at the same time. In this case, the semiconductor laser may be formed around an input terminal of the electric wire (on a stainless steel sheet on a surface of which an electric wire and electrode are formed) so that the semiconductor laser and the suspension can be integrated together.

A recording signal is generated by a signal processing LSI 54, and the recoding signal and power for the semiconductor laser are supplied to the driver for the semiconductor laser through a FPC (flexible print circuit) 50. At the moment of recording, a recording mark is formed by generating the magnetic field by a coil provided inside the air bearing slider 5 and by emitting light by the semiconductor laser at the same time. Data recorded on the recording medium 14 is read by a magnetic reader (GMR or TMR element) formed inside the air bearing slider 5. Signal processing of a read signal is performed by the signal processing circuit 54.

EXPLANATION OF THE REFERENCE NUMERALS 1 optical near-field transducer
2 main pole
3 waveguide core
4 reader
5 slider
6 magnetic head
7 coil
8 return pole
9 shield
10 polymer waveguide core
11 polymer waveguide clad
12 mirror
14 recording medium
14' recording layer
15 waveguide clad
16 suspension
17 slider air bearing surface
20 scatterer tip end portion
23 polarization direction of incident light
24 incident direction of incident light
25 recess portion on scatterer surface
26 material for scatterer surrounding area
27 magnetic pole for transmitting magnetic flux generated by coil
28 main pole upper side
29 edge of waveguide core
30 thin soft magnetic layer
31 edge of magnetic pole tip end
32 recess of magnetic pole tip end
49 voice coil motor
50 FPC
51 submount
52 circuit board for driver
53 spindle motor
54 signal processing LSI
55 semiconductor laser
100 thermally assisted magnetic head

The invention claimed is:
1. A thermally assisted recording head, comprising:
a main pole for generating a recording magnetic field;
a conductive scatterer for generating an optical near-field; and
a waveguide, having a core and a clad, for guiding light from a light source to the scatterer, wherein
the scatterer has a cross sectional shape whose width gradually becomes smaller toward a vertex at which the optical near-field is generated, a length of the scatterer in an element height direction is substantially equal to or longer than a length of the main pole in the element height direction; and a refractive index of the core of the waveguide is larger than a refractive index of the clad of the waveguide between the waveguide and the main pole.

2. The thermally assisted recording head according to claim 1, wherein the length of the scatterer in the element height direction is 200 nm to 2.06λ-1120 nm, both inclusive, wherein λnm denotes a wavelength of the light source.

3. The thermally assisted recording head according to claim 1, wherein when the wavelength λnm of the light source is 890 nm or longer, the length H of the scatterer in the element height direction satisfies the following formula:

$$\frac{\lambda - 890}{90}(-150n + 283) - 291n + 835 \leq H \leq \frac{\lambda - 890}{90}(-130n + 310) - 397n + 1250,$$

wherein n denotes a refractive index of a material for a surrounding area of the scatterer.

4. A thermally assisted recording head according to claim 1, wherein comprising:

a main pole for generating a recording magnetic field;

a conductive scatterer for generating an optical near-field; and a waveguide, having a core and a clad, for guiding light from a light source to the scatterer, wherein the scatterer has a cross sectional shape whose width gradually becomes smaller toward a vertex at which the optical near-field is generated, a length of the scatterer in an element height direction is substantially equal to or longer than a length of the main pole in the element height direction; and a distance, in a direction orthogonal to an axis of the waveguide, between the vertex of the scatterer and an edge of a core of the waveguide on a side closer to the main pole is −50 nm to 100 nm, both inclusive.

5. The thermally assisted recording head according to claim 4, wherein the distance, in the direction orthogonal to the axis of the waveguide, between the vertex of the scatterer and the edge of a core of the waveguide on the side closer to the main pole is −10 nm to 70 nm, both inclusive.

6. The thermally assisted recording head according to claim 1, wherein a depression is formed on a side surface of the main pole facing the vertex of the scatterer.

7. A thermally assisted recording device, comprising a magnetic recording medium;

a medium driving unit configured to drive the magnetic recording medium;

a light source;

a head, including: a main pole for generating a recording magnetic field, a conductive scatterer for generating an optical near-field, and a waveguide, having a core and a clad, for guiding light from the light source to the scatterer; and a head driving unit for locating the head on a desired track location position on the magnetic recording medium, wherein the scatterer has a cross sectional shape whose width gradually becomes smaller toward a vertex at which the optical near-field is generated, and a length of the scatterer in an element height direction is substantially equal to or longer than a length of the main pole in the element height direction.

8. A thermally assisted recording head, comprising:

a main pole configured to generate a recording magnetic field;

a conductive scatterer configured to generate an optical near-field; and a waveguide, having a core and a clad, configured to guide light from a light source to the scatterer;

wherein the scatterer has a cross sectional shape with a width that gradually becomes smaller in a direction toward a vertex at which the optical near-field is generated;

wherein a length of the scatterer in an element height direction is substantially equal to or longer than a length of the main pole in the element height direction; and wherein at least at a portion of the waveguide proximate to the main pole, a refractive index of the core of the waveguide is larger than a refractive index of the clad of the waveguide.

9. The thermally assisted recording head according to claim 1, wherein the length of the scatterer in the element height direction is 200 nm to 2.06λ-1120 nm, both inclusive; and wherein λnm denotes a wavelength of the light source.

10. The thermally assisted recording head according to claim 1, wherein when the wavelength λnm of the light source is 890 nm or longer, the length H of the scatterer in the element height direction satisfies the following formula:

$$\frac{\lambda - 890}{90}(-150n + 283) - 291n + 835 \leq H \leq \frac{\lambda - 890}{90}(-130n + 310) - 397n + 1250;\text{ and}$$

wherein n denotes a refractive index of a material for an area surrounding the scatterer.

11. A thermally assisted recording head according to claim 1, further comprising:

a main pole configured to generate a recording magnetic field;

a conductive scatterer configured to generate an optical near-field; and a waveguide, having a core and a clad, configured to guide light from a light source to the scatterer;

wherein the scatterer has a cross sectional shape with a width that gradually becomes smaller in a direction toward a vertex at which the optical near-field is generated;

wherein a length of the scatterer in an element height direction is substantially equal to or longer than a length of the main pole in the element height direction; and wherein a distance, in a direction orthogonal to an axis of the waveguide, between the vertex of the scatterer and an edge of a core of the waveguide on a side closer to the main pole is −50 nm to 100 nm, both inclusive.

12. The thermally assisted recording head according to claim 4,
wherein the distance, in the direction orthogonal to the axis of the waveguide, between the vertex of the scatterer and the edge of a core of the waveguide on the side closer to the main pole is −10 nm to 70 nm, both inclusive.

13. The thermally assisted recording head according to claim 1,
wherein a depression is formed on a side surface of the main pole facing the vertex of the scatterer.

* * * * *